US011481938B2

(12) United States Patent
Welsh et al.

(10) Patent No.: US 11,481,938 B2
(45) Date of Patent: Oct. 25, 2022

(54) ADAPTABLE DRAWING GUIDES

(71) Applicant: ADOBE INC., San Jose, CA (US)

(72) Inventors: Elissa A. Welsh, San Bruno, CA (US); Rishabh Vij, Haryana (IN); Gaurav Gilhotra, Abohar (IN); Ayush Bansal, Delhi (IN); Nipun Mitra, New Delhi (IN); Pulkit Mehta, Gurugram (IN); Karan Batra, Shamli (IN); Rohit Kumar Guglani, Noida (IN); Deep Sinha, Ghaziabad (IN); Will Eisley, San Francisco, CA (US); Laura Serghiou, San Francisco, CA (US)

(73) Assignee: ADOBE INC., San Jose, CA (US)

( * ) Notice: Subject to any disclaimer, the term of this patent is extended or adjusted under 35 U.S.C. 154(b) by 0 days.

(21) Appl. No.: 17/062,282

(22) Filed: Oct. 2, 2020

(65) Prior Publication Data

US 2022/0108500 A1 Apr. 7, 2022

(51) Int. Cl.
*G06T 11/20* (2006.01)
*G06F 3/0482* (2013.01)
*G06F 3/04883* (2022.01)

(52) U.S. Cl.
CPC .......... *G06T 11/203* (2013.01); *G06F 3/0482* (2013.01); *G06F 3/04883* (2013.01); *G06T 2200/24* (2013.01)

(58) Field of Classification Search
CPC ... G06T 11/203; G06T 2200/24; G06T 11/20; G06F 3/0482; G06F 3/04883; G06F 3/0481; G06F 3/048; G06F 3/0488; G06F 3/0487
See application file for complete search history.

(56) References Cited

U.S. PATENT DOCUMENTS 6,377,240 B1 * 4/2002 Baudel .................. G06T 11/001
345/157
8,769,444 B2 * 7/2014 Werner ................. G06F 3/0488
715/863

(Continued)

OTHER PUBLICATIONS

CLIP Studio Paint User Guide (http://web.archive.org/web/20180130220639/http://www.clip-studio.com:80/site/gd_en/csp/userguide/csp_userguide/500_menu/500_menu_edit_huchi.htm; pub date: Jan. 30, 2018; downloaded Apr. 28, 2021); (Year: 2018).*

(Continued)

*Primary Examiner* — Jung-Mu T Chuang
(74) *Attorney, Agent, or Firm* — Shook, Hardy & Bacon LLP

(57) ABSTRACT

Embodiments of the present invention provide systems, methods, and computer storage media directed to adaptable drawing guides. In implementations, a guide mode is identified. Generally, a guide mode indicates a manner in which to use a drawing guide to confine drawing strokes corresponding with input paths. Upon detecting an input path, a stroke is drawn in accordance with the guide mode. For example, when an edge mode is employed, the drawn stroke is confined to align with at least one edge of the drawing guide, when an inside mode is employed, the drawn stroke is confined inside of the set of edges of the drawing guide, and when the outside mode is employed, the drawn stroke is confined outside of the set of edges of the drawing guide.

20 Claims, 13 Drawing Sheets

(56) References Cited

U.S. PATENT DOCUMENTS

| | | | | |
|---|---|---|---|---|
| 8,896,621 | B1* | 11/2014 | Sipher | G06F 3/04883 |
| | | | | 345/619 |
| 9,372,563 | B2* | 6/2016 | Behzadi | G06F 3/0354 |
| 9,477,403 | B2* | 10/2016 | Dowd | G06F 3/0488 |
| 10,061,427 | B2* | 8/2018 | Bonacina | G06F 3/0416 |
| 10,254,939 | B2* | 4/2019 | Thimbleby | G06F 3/0481 |
| 10,579,237 | B2* | 3/2020 | Hatfield | G06T 11/203 |
| 2013/0127867 | A1* | 5/2013 | Tijssen | G06T 11/203 |
| | | | | 345/441 |
| 2013/0321350 | A1* | 12/2013 | Mesaros | G06F 3/0488 |
| | | | | 345/179 |
| 2015/0145784 | A1* | 5/2015 | Dowd | G06F 3/0488 |
| | | | | 345/173 |
| 2016/0357356 | A1* | 12/2016 | Migos | G06T 11/001 |
| 2017/0031530 | A1* | 2/2017 | Ikeda | G06F 3/0483 |

OTHER PUBLICATIONS

Wilson et al. ("Learn Adobe Illustrator CC for Graphics Design and Illustration" pub date: 2016; downloaded Apr. 28, 2021); (Year: 2016).*

* cited by examiner

ADAPTABLE DRAWING GUIDES

BACKGROUND

Some drawing services have been developed that provide mechanisms for users to generate drawings or sketches in an electronic format. Many electronic drawing services enable a user to generate drawing strokes in a free-form manner. For example, a user can move a finger or stylus over a canvas or background via a drawing application running on a touchscreen device to draw a line, curve, polygon, or any object. Advancements have been made as some electronic drawing services enable a template to be drawn against to "trace" the template. Generally, however, a user is "locked" into using the template. For example, when a template is employed, any input provided by a user results in a stroke that traces the template. Such an implementation, however, can be tedious and restricts flexibility in drawing on a canvas.

SUMMARY

Embodiments of the present invention relate to adaptable drawing guides. An adaptable drawing guide generally refers to a drawing guide that can be adapted for use in drawing strokes. In this way, a user can utilize a drawing guide for tracing an edge as well as using the drawing guide to confine strokes internal and/or external to the drawing guide, depending on the guide mode. A guide mode is used to indicate a manner in which the drawing guide is used as a drawing guard. In some cases, a guide mode may be selected by a user. For example, a user may select an edge mode, an inside mode, or an outside mode. When operating in an edge mode, the edges of a drawing guide are used for "tracing." When operating in inside mode, the edges of a drawing guide are used to contain any strokes to within the inside of the edges of the drawing guide. When operating in outside mode, the edges of a drawing guide are used to contain any strokes to outside of the edges. Advantageously, the guide modes can be easily switched between to result in an efficient and adaptable use of the drawing guide.

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

BRIEF DESCRIPTION OF THE DRAWINGS

The present invention is described in detail below with reference to the attached drawing figures, wherein.

DETAILED DESCRIPTION

Figure 1:
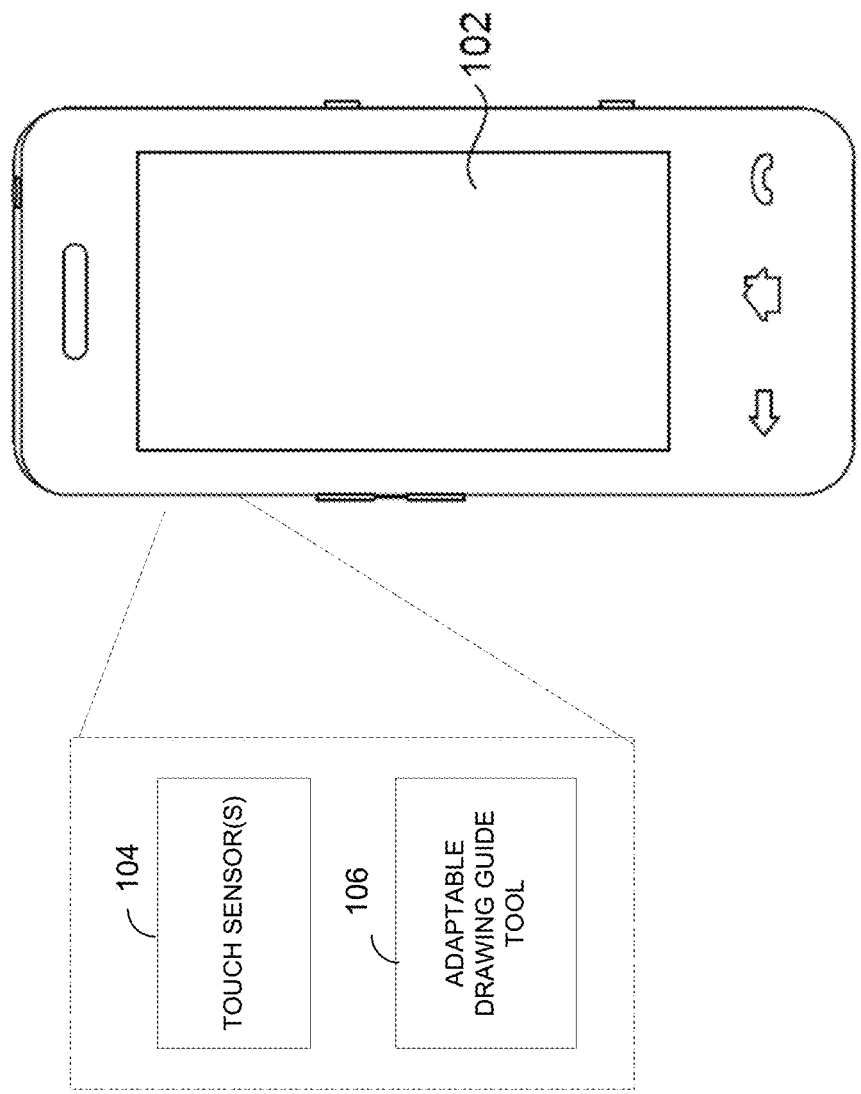
FIG. 1 is a block diagram of an exemplary computing environment suitable for use in implementing various embodiments.

The subject matter of the present invention is described with specificity herein to meet statutory requirements. However, the description itself is not intended to limit the scope of this patent. Rather, the inventor has contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Overview

Some drawing services, such as the ADOBE LINE and ADOBE SKETCH, have been developed that provide mechanisms for users to generate drawings or sketches in an electronic format. Oftentimes, however, drawing strokes generated by a user within a drawing application do not turn out as intended by a user as the input path is not as precise as desired by the user. For example, assume that a user wishes to draw a straight line. Although a user may move his or her finger in a generally straight line on a touchscreen display, variations in motion and/or a slant of the motion can result in a drawn line that is not as straight as desired by the user. As such, some templates have been developed for use in facilitating drawing straight lines or other precise shapes within drawing applications. To this end, a template can be used to "trace" the template to result in a straight or defined lines on a canvas or background. Some users, however, desire to use a template in a manner that is not limited to "tracing" a template. For instance, a user may desire to draw in a free-form manner within the template or outside of the template (e.g., draw against the template).

Further, such conventional templates can "lock" a user into using the template. For example, when a template is employed, any input provided by a user results in a stroke that traces the template. As such, transitioning from using the template to trace and drawing in a free form manner can be tedious to a user as the user may need to repeatedly toggle the template on and off multiple times to transition between tracing and free-form drawing.

As such, embodiments of the present technology are directed to facilitating drawing strokes in association with a drawing guide in an adaptable manner. In this regard, a user can effectuate precise lines or edges of a shape when the drawing guide is activated. In accordance with implementations described herein, the user can specify a particular guide mode to utilize for confining a stroke(s). A guide mode may include, for example, an edge mode that confines strokes to the edge of the drawing guide, an inside mode that confines strokes to the inside of the drawing guide, and an outside mode that confines strokes to the outside of the drawing guide. A drawing guide may be of any shape, size, or form including, for example, a line, circle, square, polygon, or other predefined shape.

Upon positioning the drawing guide over the canvas or background in a manner designated by the user, an input path provided by a user can be detected and used to draw a stroke on the canvas in accordance with a guide mode. In this regard, a stroke being drawn can be confined or restricted in accordance with an edge(s) of a drawing guide based on an applied guide mode. For instance, when an edge mode is applied, a stroke can be drawn to align with or contour an edge(s) of a drawing guide positioned on the canvas. When an inside mode is applied, a stroke is contained within the confines of the guide edges. When an outside mode is applied, a stroke is confined to be external to the drawing guide edges. In this way, a drawing guide is adaptable in how it is used to confine strokes being drawing on an electronic background or canvas. The user may transition between the modes efficiently and effectively to utilize the drawing guide(s) in a desired manner.

Advantageously, in accordance with embodiments described herein, a drawing guide can be positioned on a background while a user provides freehand drawing at the same time. This enables efficient drawing for users in a flexible manner. Further, the drawing guide described in embodiments herein is also adaptable to user-desired modifications. In this way, a user may manipulate a drawing guide to modify the position, shape, proportion, size, scale, etc. to adjust the drawing guide in a manner most suitable to the user.

Although the description provided herein is generally directed to adaptable drawing guides within a drawing application or service, as can be appreciated, the adaptable drawing guides described herein could be used in association with other types of applications or services, such as photo editing applications, electronic documents, or the like. As such, in addition to a drawing environment, the adaptable drawing guides may be implemented in any number of environments including any non-drawing environment such as, for example, images, web content, text, photographs, documents, or the like.

Some terms and phrases are used in accordance with embodiments described herein. Example descriptions are provided for illustrative purposes, but are not intended to be limiting in scope.

An adaptable drawing guide generally refers to a drawing guide that is adaptable in how it can be used. For example, an adaptable drawing guide can be used to trace the shape of the drawing guide, to confine strokes to being drawn within the drawing guide, and/or to confine strokes to being drawn outside of the drawing guide.

A drawing guide generally refers to an aid, shape, or template used to confine strokes or lines drawn on a background or canvas. A drawing guide can be of any shape.

A guide mode refers to a mode for utilizing a drawing guide. A guide mode generally indicates a manner of how a drawing guide is to be used to confine strokes. Example guide modes include an edge mode, an inside mode, and an outside mode.

An edge mode enables a stroke to be drawn along a guide edge(s) in a consistent manner. In this regard, when in an edge mode, as a user provides an input, a stroke may be automatically drawn in alignment with a guide edge.

An inside mode enables a stroke(s) to be drawn within the guide edge(s) such that a stroke(s) is constrained within the confines of the guide edge(s).

An outside mode enables a stroke(s) to be drawn outside of the guide edge(s) such that a stroke(s) is constrained to the outside of the guide edge.

Environment for Adaptable Drawing Guide Tool

In accordance with embodiments described herein, FIG. 1 illustrates an exemplary computing device 100 that is utilized to implement an adaptable drawing guide tool. The computing device 100 can be any device associated with a display screen 102, such as the computing device 1300 of FIG. 13. The display screen 102 is a screen or monitor that can visually present, display, or output information, such as, for example, drawings, sketches, images, text, figures, values, symbols, videos, video clips, movies, photographs, lists, data sets, webpages, emails, text messages, notifications, or any other content. In some embodiments, the computing device 100 is a portable or mobile device, such as a mobile phone, a personal digital assistant (PDA), a video player, a laptop, or any other portable device associated with a display screen. In some implementations, the computing device 100, such as a portable device, includes the display screen 102. That is, a display screen is integrated or coupled with the portable device. In other implementations, a display screen is remote from, but in communication with, the computing device.

The display screen 102 may be a touchscreen display, in accordance with embodiments described herein. A touchscreen display enables detection of location of touches or contact within a display area. In this regard, a touchscreen display refers to a display screen to which a user can provide input or interact therewith by making physical contact or near contact with the display screen. An illustrative example includes a user utilizing his or her finger to tap or move, or use some other form of touch action, to interact with a user device. Other items, such as a stylus, fingernail, etc., may be used to provide input to the device by way of touchscreen display. As such, a touchscreen display can be used as an input component irrespective of whether a keyboard or mouse is used as an input component for interacting with displayed content. Touchscreen displays can be implemented using any of a variety of touchscreen technologies. By way of example, and not limitation, a touchscreen display might be based on various touchscreen technologies such as resistive, surface-acoustic wave, capacitive, infrared, optical imaging, dispersive signal technology, acoustic pulse recognition, and other technologies known in the art.

As shown in FIG. 1, the exemplary computing device 100 includes a touch sensor(s) 104. A touch sensor(s) 104 may be any touch sensor(s) that detects contact or touch of an object with the display 102 of the computing device 100.

Such an object may be, for example, a user digit (e.g., a finger), a stylus, or another component that contacts a touchscreen display. A touch sensor(s) 104 may be any sensor suitable to detect an indication of touch, such as, for example, a capacitive sensor or a resistive sensor. As can be appreciated, any number of touch sensors may be utilized to detect contact with a touchscreen display.

In operation, a touch sensor detects contact of an object with at least a portion of a display 102 of the computing device 100. A touch sensor may generate a signal based on contact with at least a portion of the display 102 associated with the computing device 100. The signal generated by the touch sensor(s) may be communicated (e.g., directly or indirectly) to the adaptable drawing guide tool 106, or other component, such that the adaptable drawing guide tool 106 can facilitate drawing a stroke(s) in accordance with an adaptable drawing guide(s) and, in particular, a guide mode associated therewith.

In one embodiment, the touch sensor(s) 104 may be calibrated to generate a signal or communicate the signal upon exceeding a certain threshold generally accepted as being representative of sufficient contact. For example, in an instance when a touch sensor(s) 104 measures a certain threshold temperature or conductivity, the touch sensor(s) 104 may generate a signal and communicate the signal to the adaptable drawing guide tool 106. On the other hand, when the touch sensor(s) 104 does not measure the certain threshold temperature or conductivity, the touch sensor(s) 104 may fail to generate the signal or communicate the signal to the adaptable drawing guide tool 106. The touch sensor(s) 104 may be configured to generate signals based on direct human touch or touch using another object (e.g., a stylus, etc.). As can be appreciated, the sensitivity of the touch sensor(s) 104 implemented into the device 100 can affect when contact is registered or detected.

As described, the touch sensor(s) 104 transmits signals to the adaptable drawing guide tool 106 to indicate contact with the display 102. The adaptable drawing guide tool 106 is generally configured to facilitate generating a drawing stroke or set of strokes in accordance with an adaptable drawing guide(s). As such, upon referencing signals indicating a touch event or gesture in connection with the display 102 (or manipulation of a selector via a touchscreen display or non-touchscreen display), the adaptable drawing guide tool 106 can utilize such data to determine a manner in which to draw one or more drawing strokes and, thereafter, initiate drawing of the appropriate stroke(s).

In some cases, the adaptable drawing guide tool 106 is part of an application that performs the drawing functionality. For example, the adaptable drawing guide tool 106 might perform drawing functionality within drawing and/or editing software. In other cases, the adaptable drawing guide tool 106 might be distinct from an application that performs the drawing functionality. In this regard, the adaptable drawing guide tool 106 might determine a manner in which to draw one or more strokes and, thereafter, communicate with an application that subsequently performs the drawing functionality. Irrespective of whether the adaptable drawing guide tool 106 or another component performs the stroke drawing, a user of the computing device 100 can view the drawing, and strokes performed in accordance therewith, via the display 102.

Although the computing device 100 of FIG. 1 is described as a having a touchscreen display, as can be appreciated, computing devices without a touchscreen display are contemplated as within the scope of embodiments described herein. In this regard, a point(s) selected via a mouse or other selecting device can be detected and used in accordance herewith to initiate drawing a stroke(s) in accordance with an adaptable drawing guide(s). As another example, an air gesture can be detected and used in accordance herewith to initiate drawing a stroke(s) in accordance with an adaptable drawing guide(s).

Figure 2:
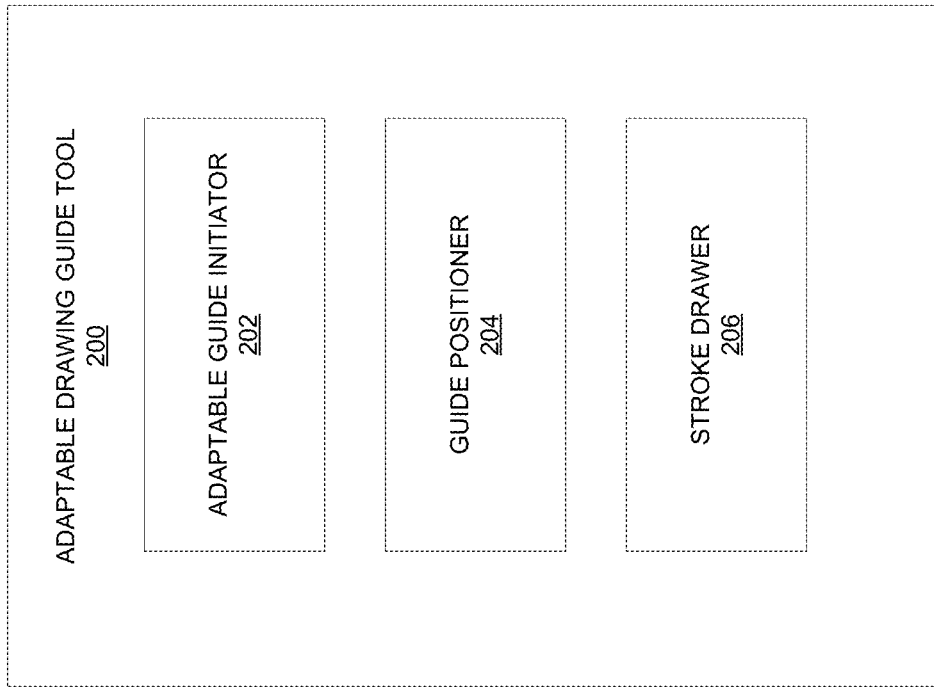
FIG. 2 is a block diagram of an exemplary adaptable drawing guide tool, in accordance with embodiments described herein.

Turning now to FIG. 2, a block diagram is provided illustrating an exemplary adaptable drawing guide tool 200 in which some embodiments may be employed. The adaptable drawing guide tool 200 is generally configured to enable adaptable drawing of a stroke(s) on a canvas or background using a drawing guide(s). As described in more detail below, in one implementation, drawing a stroke in accordance with an adaptable drawing guide can vary depending on a guide mode applied. In particular, a stroke being drawn can be confined or restricted in accordance with an edge(s) of a drawing guide based on an applied guide mode. Example guide modes include an edge mode, an inside mode, and an outside mode. When an edge mode is applied, a stroke can be drawn to align with or contour an edge(s) of a drawing guide positioned on the canvas. When an inside mode is applied, a stroke is contained within the confines of the guide edges. When an outside mode is applied, a stroke is confined to be external to the drawing guide edges. In this way, a drawing guide is adaptable in how it is used to confine strokes being drawing on an electronic background or canvas. In operation, the adaptable drawing guide tool 200 is used to position a drawing guide on a canvas background in a location at which a user desires to utilize a drawing guide and, thereafter, generate or draw a stroke via a user input (e.g., a touch input) based on an guide mode identified to be applied.

An adaptable drawing guide can be of any shape that can be used to confine or guide a stroke being electronically drawn on a background or canvas. Generally, an adaptable drawing guide can be used as a guide for drawing or "tracing" an edge(s) of the guide, drawing within the guide, and/or drawing outside of the guide. In this way, an adaptable drawing guide is used for "tracing" an edge by a user to result in a precise or predetermined line or shape and/or used as a boundary to draw internal or external to the drawing guide. A drawing guide can take on any shape, size, or form, such as, for example, a circular pattern, a rectangular pattern, a polygonal shape, a pattern form, or any shape or object. Generally, a drawing guide is formed from one or more edges, which may also be of any shape, size, or form. For instance, a guide edge might be a straight, curved, zig-zag, patterned, or the like. The edge(s) of a drawing guide forms or define the boundary. As such, an inside or internal portion of a drawing guide is within the boundary of the guide, and an outside or external portion of the drawing guide is outside of the boundary of the guide.

Generally, a user indicates or initiates an input path in association with a drawing guide in some manner. For instance, a user may contact a finger on a touchscreen and move the finger in proximity to a drawing guide edge to generate a drawing stroke that aligns with the drawing guide edge. As another example, a user might move a selector in proximity to a drawing guide edge via a mouse to generate a stroke that aligns with the drawing guide edge. A stroke or drawing stroke generally refers to an electronic mark (e.g., line) presented, via a graphical user interface, on a background or canvas. A stroke may be of any of a number of formats including, for example, any width, length, color, pattern, etc. Such customizations or configurations associated with a stroke may be user selected or defined. A background or canvas refers to a background view that can have content (e.g., strokes) presented over the background. As can be appreciated, the background or canvas can be of any size, shape, color, pattern, image, etc. By way of example, a user may select a background, such as a patterned background. Upon selecting a background, a user may initiate various strokes in association with an adaptable drawing guide to overlay the background.

Utilizing an adaptable drawing guide, a user can efficiently and effectively draw in a controlled manner. In particular, a drawing guide may be used in various manners to adapt to the desires and needs of a user. In this way, an adaptable drawing guide may be used to "trace" edges of the guide, to prevent strokes from being drawn within the boundary or confines of the guide, and/or to prevent strokes from being drawing outside of the boundary or confines of the guide. Advantageously, a user may efficiently transition from using a drawing guide in one manner to using the same drawing guide in another manner. Further, the drawing guide can be adjustable in form such that the size, shape, and placement may be easily modified for more configurable use by a user.

As shown in FIG. 2, the adaptable drawing guide tool 200 includes an adaptable guide initiator 202, a guide positioner 204, and a stroke drawer 206. It should be understood that this and other arrangements described herein are set forth only as examples. Other arrangements and elements (e.g., machines, interfaces, functions, orders, groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

The adaptable guide initiator 202 is configured to initiate utilization of an adaptable drawing guide. As such, the adaptable guide initiator 202 enables application of an adaptable drawing guide. As previously described, the adaptable drawing guide is generally configured to confine strokes in accordance with a guide mode. That is, strokes being drawn can be confined in association with a drawing guide in different ways depending on the guide mode being applied.

In some embodiments, the adaptable guide initiator 202 enables application of an adaptable drawing guide(s) upon detecting a user indication to enable an adaptable drawing guide(s). A user might provide such an indication in any manner. For example, a user may select a "drawing guide" or "adaptable drawing guide" icon or setting (e.g., in a navigation bar) to initiate an adaptable drawing guide(s). Accordingly, the adaptable guide initiator 202 might detect an indication to apply an adaptable drawing guide and, in response thereto, enable the utilization of the adaptable drawing guide(s).

In other embodiments, the adaptable guide initiator 202 might enable the adaptable drawing guide functionality automatically. For example, in accordance with a default setting or initiation of an application including the adaptable drawing guide, the adaptable guide initiator 202 may automatically permit application of the adaptable drawing guide.

As previously described, a drawing guide can take on any shape, size, or form, such as, for example, a circular pattern, a rectangular pattern, a polygonal shape, an object, or the like. In some cases, a drawing guide can take on the form of an image or item such that it represents a particular object or item as opposed to a generic shape or form. For instance, a drawing guide may represent a table, a person, a car, a ruler, or any other object or set of objects.

In some embodiments, a particular drawing guide to utilize for drawing a stroke(s) can be selected by a user. Such a guide selection may be made in any manner. For instance, a user may select an icon or representation of a particular drawing guide desired for use by selecting the corresponding icon or representation. A set of guides may be presented within a menu, list, or the like. In some cases, a user may toggle through various drawing guides until a desired drawing guide is identified. In other cases, a user may select a specific drawing guide from a set of drawing guides concurrently presented.

In some cases, a default drawing guide may be automatically selected for display. Such a default drawing guide may be the only available drawing guide for use or may be an initial drawing guide displayed to the user. In the latter case, the user may then select an alternative drawing guide, if desired, to replace the initially presented default guide. For instance, a drawing guide having a circular shape may be initially displayed. Upon display of the initial shape, the user may select to change the specific drawing guide used, for example, to a rectangular shape, polygonal shape, or the like.

Upon initiating and presenting an adaptable drawing guide, an adaptable drawing guide can be used to draw a stroke in accordance therewith. The guide positioner 204 is configured to facilitate positioning an adaptable drawing guide on a canvas or background for use in generating a stroke(s) in accordance with, or as confined by, the drawing guide. An adaptable drawing guide can be positioned on a canvas according to a preferential or desired placement of a user. An adaptable drawing guide can be any guide that can be used to confine a stroke being drawn over a background or canvas. As one example, a drawing guide can be "traced" to generate a precise or consistent stroke that aligns with an edge(s) of the guide. As another example, a drawing guide can be used to contain strokes within the boundary of the guide and/or outside the boundary of the guide.

The guide positioner 204 can position a drawing guide in any number of ways based on user interactions with a drawing guide. In this regard, the guide positioner 204 can translate, rotate, scale, and/or transform a drawing guide in accordance with user indications. Accordingly, a user can position a drawing guide according to his or her preferences on a canvas. Such manipulations to a drawing guide can be performed in any number of manners, and the examples provided herein are merely exemplary in nature.

In some embodiments, a drawing guide, or portion thereof, can be manipulated using one or more points in association with a drawing guide. For example, a drawing guide, or portion thereof (e.g., an edge) may be selected and moved to modify the placement of the drawing guide or the size/shape of the drawing guide.

A drawing guide may be translated on the display based on a motion or input to align a guide as desired. In this regard, a drawing guide may be moved up, down, and/or to the side by moving a finger or other object positioned over the drawing guide in a desired direction. As can be appreciated, such a translation may occur when contact is made, for instance, with any portion of a drawing guide, with a particular area of a drawing guide, or the like.

A drawing guide may also be rotated to align the drawing guide as desired by the user. In this regard, a drawing guide may be rotated any number of degrees by moving a finger(s) or other object positioned over a drawing guide in a desired rotation or direction. As can be appreciated, such a rotation may occur when contact is made, for instance, with a portion of a drawing guide, with a particular area of a drawing guide (e.g., edge), or the like.

A drawing guide may also be scaled or sized as needed by the user. In this regard, a drawing guide may be increased or decreased in size or shape by moving a finger(s) or other object(s) positioned in association with a drawing guide in a particular manner. As can be appreciated, such a scaling may occur when contact is made, for instance, with a portion of a drawing guide, with a particular area of a drawing guide, or the like. As one example, movement of fingers positioned over on or near the drawing guide may be used to effectuate scaling of the drawing guide by moving the fingers closer together or further apart to decrease or increase the size of the drawing guide, respectively. As can be appreciated, the drawing guide may be modified in a proportional or disproportionate manner.

In some cases, a drawing guide may be desired to be transformed or skewed. For example, a user may desire to transform an equilateral triangle guide to an isosceles triangle template. In such a case, the user may wish to transform one or more edges of the drawing guide to generate the desired triangular guide. Transformation may occur in any number of manners including, modification of an edge(s) of the guide. For instance, a user may select a guide edge for a predetermined or threshold amount of time and, upon exceeding a threshold time, manipulate the edge to the appropriate size, position, etc. For instance, upon contacting a guide edge for two seconds, the guide edge may turn a color (e.g., blue) indicating the guide edge may be manipulated to transform the guide, or portion thereof.

Generally, to manipulate a drawing guide based on user interactions, the guide positioner 204 can be configured to detect user interactions in association with a drawing guide. Such user interactions may be referred to herein as guide interactions, that is, motion or interaction that is applied to or associated with a drawing guide. Accordingly, the guide positioner 204 may identify a guide interaction, or portion thereof. That is, the guide positioner 204, or other component in communication therewith, may detect at least a portion of a drawing guide interaction, for example, in accordance with a motion and/or contact with a drawing guide, or portion thereof. A guide interaction refers to any path, motion, or interaction designated for manipulating a drawing guide, or a potion thereof. A guide interaction can take on any shape, pattern, direction, or form as described above (e.g., touch motion or selector).

Various input data might be used to detect a guide interaction. For example, a position indicator refers to an indication of a position, location, or area of a guide interaction, or portion thereof (e.g., contact with a touchscreen display). Accordingly, a position indicator might be a pixel(s) contacted, an x and/or y coordinate associated with a selector or a point(s) of contact (e.g., an x and/or y coordinate of a pixel that corresponds with a contacted area of a touch display screen), or the like. Additional or alternative data may be used in detecting a guide interaction. For example, a direction indicator refers to a direction of a guide interaction. A velocity indicator refers to a velocity in which a guide interaction is performed. An acceleration indicator refers to an acceleration of a guide interaction. A magnitude indicator refers to a magnitude, distance, extent, displacement, or degree of a guide interaction. A guide interaction can be provided in any number of formats including a touch gesture indicated through a touch interface, an air gesture indicated by a user made in space, or a mouse gesture indicated through a selector or cursor, or the like.

The guide positioner 204 might receive, retrieve, or access signals from one or more touch sensors indicating touch. In embodiments, input data might be raw data generated by one or more touch sensors, such as touch sensor(s) 104 associated with touchscreen display 102 of FIG. 1. Alternatively or additionally, input data may be derived, calculated, identified, or determined, for example, based on raw data generated by touch sensors. That is, signals generated from touch sensors may be processed to identify input data. By way of example only, signals received by the guide positioner 204, or another component, can be processed to determine x and/or y coordinates identifying locations that correspond with an area of a touchscreen display contacted by an object. Any algorithm and/or lookup technique can be utilized to normalize, determine, calculate, identify, and/or derive various types of contact data.

Upon detecting a user interaction(s) or guide interaction, the guide positioner 204 can identify a particular manner in which to manipulate a drawing guide. That is, based on a guide interaction detected, the guide positioner 204 can determine or identify a manner in which to manipulate the drawing guide. By way of example only, the guide positioner 204 can identify a guide manipulation in accordance with a type of motion, a motion direction, a motion velocity, a motion acceleration, etc. As described above, a guide manipulation (e.g., translation, rotation, scale, alignment, transformation) to apply based on a user interaction may be configured in any number of ways and is not limited to any example provided herein. Such a determination may be made using a lookup system, a set of rules, an algorithm, or any other methodology or combination of methods to determine guide manipulation based on the guide interactions provided by a user.

By way of example only, the guide positioner 204 might recognize and apply a guide translation when a user contacts a drawing guide while simultaneously sliding a finger contacting the drawing guide, a rotational translation when a user contacts a drawing guide while simultaneously rotating a finger contacting the drawing guide, a guide scaling when a user contacts a guide with two fingers and slides the fingers closer together or further apart, and a guide transformation when a user contacts a guide, or portion thereof, for a particular length of time and then contacts the guide or guide edge to transform the guide. As can be appreciated, each of these guide manipulations can be distinguished by the guide positioner 204 from a motion of a single finger that is used to initiate drawing a stroke.

The stroke drawer 206 is configured to initiate and/or perform drawing functionality. Generally, the stroke drawer 206 initiates and/or draws a stroke in accordance with an input (e.g., a touch input provided via a touchscreen display). In accordance with implementations described herein, a stroke(s) can be drawn on the canvas in a free-form manner within a drawing guide, in a free-form manner outside of a drawing guide, and/or to align with a guide edge. A stroke or drawing stroke refers to the actual line or drawing representation this is presented on the background or canvas.

To draw a stroke, the stroke drawer 206 may identify input path (e.g., as provided by a user), or portion thereof. That is, the stroke drawer 206, or other component in communication therewith, may detect at least a portion of an input path being traversed, for example, in accordance with a touch motion with a touchscreen or a selector motion. An input path refers to any path provided to effectuate drawing at least a portion of content (e.g., a drawing or sketch). An input path can take on any shape, pattern, or form such as, for example, a rotation or circular pattern, a line pattern, a polygonal shape, a free-form shape, or the like.

Various input data might be used to detect an input path. For example, a position indicator refers to an indication of a position, location, or area of a stroke path, or portion thereof (e.g., contact with a touchscreen display). Accordingly, a position indicator might be a pixel(s) contacted, an x and/or y coordinate associated with a point(s) of contact (e.g., an x and/or y coordinate of a pixel that corresponds with a contacted area of a touch display screen), or the like. Additional or alternative data may be used in detecting an input path. For example, a direction indicator refers to a direction of an input path. A velocity indicator refers to a velocity in which an input path is performed. An acceleration indicator refers to an acceleration of an input path. A magnitude indicator refers to a magnitude, distance, extent, displacement, or degree of an input path. An input path can be provided in any number of formats including a touch gesture indicated through a touch interface, an air gesture indicated by a user made in space, or a mouse gesture indicated through a selector or cursor, or the like.

The stroke drawer 206 might receive, retrieve, or access signals from one or more touch sensors indicating touch. In embodiments, input data might be raw data generated by one or more touch sensors, such as touch sensor(s) 104 associated with touchscreen display 102 of FIG. 1. Alternatively or additionally, input data may be derived, calculated, identified, or determined, for example, based on raw data generated by touch sensors. That is, signals generated from touch sensors may be processed to identify input data. By way of example only, signals received by the stroke drawer 206, or another component, can be processed to determine x and/or y coordinates identifying locations that correspond with an area of a touchscreen display contacted by an object. Any algorithm and/or lookup technique can be utilized to normalize, determine, calculate, identify, and/or derive various types of input data.

The stroke drawer 206 is generally configured to draw strokes on a background or canvas. In accordance with embodiments described herein, the stroke drawer 206 determines a manner in which to confine a stroke(s) based on a guide mode being applied. As described, a guide mode refers to a mode for utilizing a drawing guide. Example guide modes include an edge mode, an inside mode, and an outside mode. An edge mode enables a stroke to be drawn along a guide edge(s) in a consistent manner. In this regard, when in an edge mode, as a user provides an input, a stroke may be automatically drawn in alignment with a guide edge. An inside mode enables a stroke(s) to be drawn within the guide edge(s) such that a stroke(s) is constrained within the confines of the guide edge(s). An outside mode enables a stroke(s) to be drawn outside of the guide edge(s) such that a stroke(s) is constrained to the outside of the guide edge.

A guide mode can be identified in a number of ways. In some embodiments, a user may select a guide mode via a graphical user interface. As such, the stroke drawer 206 can identify a guide mode associated with a stroke(s) based on the user-selected guide mode. A user may select a guide mode any number of ways. As one example, a user may select an icon representing an edge mode to draw a stroke along an edge(s) of a drawing guide, select an icon representing an inside mode to draw a stroke contained within the drawing guide, and select an icon representing an outside mode to draw a stroke restricted to the outside of the drawing guide. In some cases, a set of guide modes may be concurrently presented as a user is drawing on a canvas. For instance, a set of icons or other representations (e.g., text) within a list or menu may be presented. In other cases, a user may toggle through guide modes or select via a pull down menu or list.

As another example, a guide mode may be identified based on an initial location of a user input to create a stroke. For example, assume an initial input for drawing a stroke is within a guide, an inside mode may be identified. On the other hand, an initial input outside of a guide may result in identification of an outside mode, and an initial input on or near an edge (e.g., within a threshold distance) of a guide may result in an edge mode. As yet another example, a user may select a guide mode with a distinct indication on the display screen that is separate from the input path. For example, a user may simply touch any point outside of the drawing guide to indicate an outside mode.

Upon identifying a guide mode for use in drawing a stroke or set of strokes, the stroke drawer 206 can draw a stroke in accordance with the input path and the identified guide mode. As described, guide modes may include an edge mode, an inside mode, and an outside mode. In some embodiments, each of the edge mode, inside mode, and outside mode may be optional guide modes. In other embodiments, a portion of such guide modes may be options for selecting by a user. For instance, in one implementation, an inside and outside guide mode may be provided as options for confining strokes drawn on a canvas.

The edge mode generally enables a stroke to be drawn along a guide edge(s) in a consistent manner. In this regard, when in an edge mode, as a user provides an input, a stroke may be automatically drawn in alignment with a guide edge(s). As can be appreciated, the width of the drawn stroke may be provided in a consistent manner such that the stroke drawn around the edge of the drawing guide is consistent in appearance. As such, even when a user varies from a consistent input, the drawn stroke appears consistent. Accordingly, in the edge mode, the stroke drawer 206 can adjust for the free hand input by the user to draw a stroke that abuts the edge of the guide.

In accordance with determining to draw a stroke that aligns with a guide edge(s), the stroke can be drawn and presented on the display screen as the user moves an object (e.g., finger) along the touchscreen display, for example. That is, while a user moves a finger or selector in a motion along an input path, a stroke can be drawn, via a graphical user interface, in a coordinated manner alongside the edge of a guide as though the guide is being "traced." The stroke can be drawn in a one-to-one correspondence (or any other scale or ratio) as the motion input by the user. In some cases, the specific guide edge at which to draw the stroke may also be identified. Such an identification can be made in any manner, for example, including selecting a guide edge that is closest or nearest the input path or initial contact of the input path. In some implementations, a mid-point of a stroke (e.g., mid-point of a stroke width) can align with the edge of the drawing guide. For example, if a brush size is 50 pixels thick, 25 pixels will result on one side of the drawing guide edge and 25 pixels will result on the other side of the drawing guide edge.

In some implementations, in addition to drawing along a guide edge when in edge mode, the edge mode enables a stroke to be drawn in free-form internal and/or external to the drawing guide. For example, when an input is detected within a threshold distance of a guide edge (e.g., within 10 pixels), a stroke is drawn alongside an edge. On the other hand, when an input is detected outside of a threshold distance of a guide edge, a stroke is drawn in free-form in accordance with the input. In some cases, the free-form drawing may be limited to the inside or outside of the drawing guide. For instance, when an input is within a threshold distance of a guide edge (e.g., outside of the edge), a stroke is drawn alongside an edge. When an input is detected outside of the threshold distance of the guide edge and when the input is outside of the guide edges, a stroke is drawn in free-form in accordance with the input. Generally, drawing a stroke in a free-form manner includes the drawn stroke corresponding with or matching an actual input path. In such cases, an input within the guide edges may result in actions other than drawing a stroke in the guide, such as movement of the drawing guide on the display screen, or the like.

In accordance with detecting an input path, or portion thereof (e.g., initial contact point for an input) when operating in edge mode, a determination may be made as to whether to draw the stroke in association with a guide edge. Any number of technologies may be used to distinguish between a stroke to align with the guide edge and a stroke to be drawn in a free-form manner. In some implementations, as described above, the proximity or distance between the input path and a guide edge can be used to determine whether a stroke should be drawn in accordance with the particular guide edge. For instance, a stroke path within a predetermined distance or proximity from a guide edge may be deemed to correspond or overlap with the guide edge such that the drawing stroke contours the guide edge. By way of example, and not limitation, a guide edge being within a predetermined proximity of pixels or coordinates associated with an input path, or portion thereof, can be deemed as an indication to draw a stroke that aligns with the guide edge. To the extent the input path is deemed to correspond, overlap, or coincide with the guide edge, the stroke is drawn along the guide edge as the input path is traversed.

In yet another implementation, an input path detected within or touching the boundaries of a guide may be deemed to be an input path intended to draw a stroke that aligns with the guide edge, while an input path detected outside the boundaries of the guide may be deemed to be a free-form path that does not automatically align with the guide edge. In this regard, whether or not a stroke is drawn to contour a guide edge can be triggered based on a location or position selected or at which a stroke path traverses. In such embodiments, when a location or position at which an input path traverses corresponds or aligns with a guide or guide edge, a stroke is drawn that aligns with guide edge. In effect, by selecting or providing contact within a guide, the user is designating a drawing stroke to align with the guide regardless of the path of the stroke input by the user. In contrast, when a location or position at which a stroke path is traversed does not correspond, align, or overlay a guide, or otherwise indicate a desire to align a stroke with a guide edge, a free-form stroke may be detected and applied. In this regard, when a selection or an input path exists at a location that does not align with any guide or guide edge, a free-form stroke can be applied. As such, the drawing stroke aligns with the actual input path and not a guide or guide edge.

As can be appreciated, a selection or an indication of a stroke to align with a guide edge may be provided in any manner. For instance, a user may contact a touchscreen at a location of a guide, click on a guide or guide edge using a pointer or selector, begin a stroke path within one or more guide boundaries, begin or perform a stroke path within a predetermined vicinity of a guide or guide edge, etc. Selection to align a stroke with a guide edge may be discrete from performance of an input path or continuous with providing an input path. That is, a user may provide a single contact with a guide to indicate a desire to utilize a guide edge to generate a drawing stroke, remove his or her finger from the touchscreen display, and then begin a touch motion to designate an input path, for example. Alternatively, a user may provide an initial contact with a guide edge to select the guide edge to which to align and, thereafter, continue performance of the input path to draw the stroke without removing his or her finger until completing the input path.

The inside mode enables a stroke(s) to be drawn within the guide edge(s) such that a stroke(s) is constrained within the confines of the guide edge(s). To this end, any input provided by a user results in strokes contained within the guide. Stated differently, the guide operates as a guard to keep any drawn strokes within the edges of the guide. For example, even when a user input moves outside of the boundary or edge of a guide, the drawn stroke is contained within the guide. In implementations, when operating via inside mode, a stroke, or portion thereof, is not drawn outside of the guide. In this way, any user input outside of the guide does not result in a stroke being drawn on the canvas. Other implementations may accommodate drawing outside of the guide, even in inside mode. For example, if an input path is more than a threshold distance from an edge of the guide, an input path outside of the guide may be drawn.

In operating via inside mode, when a location or position at which an input path is traversed corresponds, aligns, or overlays a guide, or otherwise indicates a desire to draw a stroke within a guide, the input path may be detected and applied within the guide. Stated differently, when a selection or an input path exists at a location that aligns with a guide, a free-form stroke can be applied within the guide. In this regard, the drawing stroke aligns with the actual stroke path. On the other hand, when an input does not align or overlay a guide (e.g., the input is external to the guide edges), no stroke is drawn on the canvas. In some cases, when in inside mode, selection or input outside of the guide may result in movement, positioning, sizing, etc. of the guide.

The outside mode generally draws a stroke(s) outside of the guide edge(s) such that the stroke(s) is constrained to the outside of the guide edge. As such, in cases that an input path continues through the inside of the guide, the stroke being drawn would stop at the edge of the guide such that the drawn stroke would not go within the confines of the guide edge. To this end, any input provided by a user results in strokes confined external to the boundaries of the guide. Stated differently, the guide operates as a guard to keep any drawn strokes outside the edges of the guide. For example, even when a user input moves inside of the boundary or edge of a guide, the drawn stroke is external to the boundaries of the guide. In implementations, when operating via outside mode, a stroke, or portion thereof, is not drawn inside of the guide. In this way, any user input inside of the guide does not result in a stroke being drawn on the canvas. Other implementations may accommodate drawing inside of the guide, even in outside mode. For example, if an input path is more than a threshold distance from an edge of the guide, an input path inside of the guide may be drawn.

In operating via outside mode, when a location or position at which an input path is traversed corresponds, aligns, or overlays a guide, or otherwise indicates a desire to draw a stroke outside a guide, the input path may be detected and applied. Stated differently, when a selection or an input path exists at a location that does not align with or overlay a guide, a free-form stroke can be applied outside of the guide.

In this regard, the drawing stroke aligns with the actual stroke path when outside of the boundaries of the guide. As such, a user may still trace an edge of the guide, but it is now a free-form application and not necessarily uniform. On the other hand, when an input does align or overlay a guide (e.g., the input is internal to the guide edges), no stroke portion is drawn on the canvas. In some cases, when in outside mode, selection and input inside of the guide may result in movement, positioning, sizing, etc. of the guide.

As previously described, the stroke drawer 206 may perform the stroke drawing or initiate drawing, for example, by providing stroke details to another component that, thereafter, performs the stroke drawing. Irrespective of the component used to draw the stroke, the stroke can be formatted in any number of ways. By way of example only, a stroke can be formatted in various colors, various widths, various patterns, and/or the like. As can be appreciated, such formats may be default formats, system determined formats, or user-selected formats.

Figure 3:
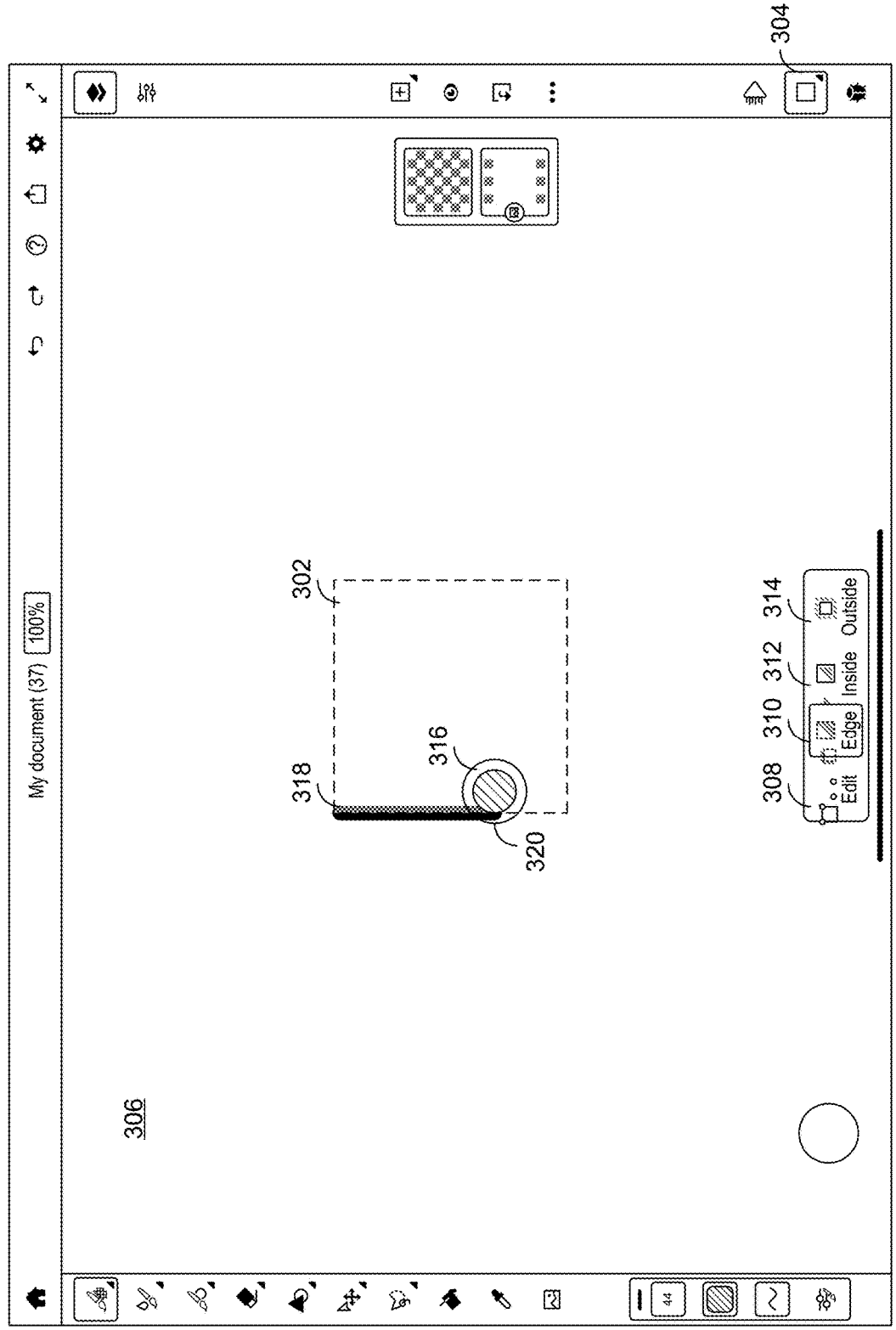
FIG. 3 is a first exemplary graphical user interface for using an adaptable drawing guide, in accordance with embodiments.

Example Graphical User Interfaces Associated with an Adaptable Drawing Guide Tool Turning now to FIGS. 3-8, FIGS. 3-8 provide exemplary user interfaces in accordance with implementing various embodiments described herein. These are only examples and are not intended to limit the scope of embodiments described herein. With initial reference to FIG. 3, FIG. 3 provides an example of a drawing guide 302 presented on a display screen 300. In FIG. 3, the drawing guide 302 is in the form of a square. A user may select the drawing guide 302 from among a number of drawing guide options by contacting or selecting drawing guides icon 304. For example, a user may rotate through possible guides by selecting drawing guides icon 304. As another example, a set of candidate drawing guides may be presented via the graphical user interface upon an indication (e.g., hover or selection) associated with the drawing guides icon 304. The drawing guide 302 may be presented in a default form (e.g., shape) and in a default location (e.g., central). For instance, selecting the drawing guides icon 304 may result in presentation of a square drawing guide placed in the center of the canvas 306. As described, the drawing guide 302 may be moved, resized, rescaled, reformed, etc. on the canvas 306 as desired by a user based on user manipulations, such as for example, movement of the guide, or a portion thereof (e.g., a guide edge). As one example, a user may select the edit icon 308 to edit the drawing guide 302. Selecting the edit icon 308 can enable the user to move, resize, rescale, reform, and/or otherwise manipulate the drawing guide 302.

Upon positioning the drawing guide 302 appropriately, the guide can be used to draw strokes in association with the drawing guide, as generally described above. That is, the drawing guide can be traced or used as a guard to maintain drawing strokes internal or external to the drawing guide. A user may select a guide mode for use in drawing strokes on the canvas. As shown, the user may select an edge mode 310, an inside mode 312, and an outside mode 314. The user can change between modes by selecting a desired mode 310-314.

Assume a user selects the edge mode 310. In such a case, as a user contacts (or uses a selector) to provide an input path along one of the edges of the drawing guide 302, a stroke is drawn on the canvas that follows the edge of the drawing guide 302. In other words, the drawing guide 302 acts as an electronic stencil to draw the line. As such, a stroke that aligns with the guide edge can be generated and displayed in accordance with input paths provided by the user. Advantageously, a user may provide input along any portion of an edge or set of edges. As such, although a full shape drawing guide may be provided, only a portion of the shape may be used to draw a stroke on the canvas. As can be appreciated, the portion of the stroke corresponding with the user input can be displayed in real time such that a user may review the drawn stroke. For instance, at the point where contact is illustrated via circle 316, the drawn stroke is illustrated from the starting point 318 to the current point 320.

Figure 4:
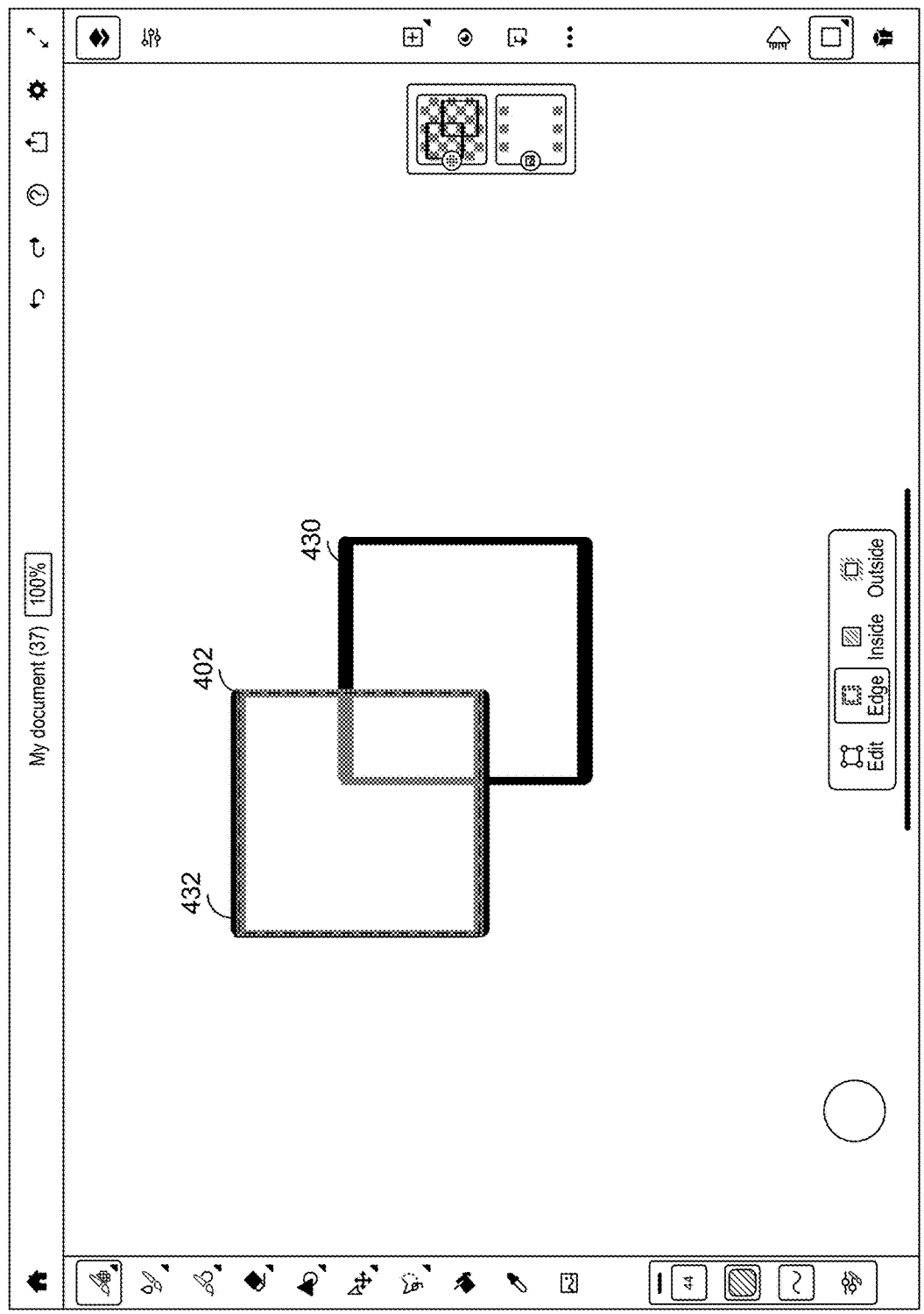
FIG. 4 is a second exemplary graphical user interface for using an adaptable drawing guide, in accordance with embodiments.

As shown in FIG. 4, assume the user completed input provided around each edge of the drawing guide. As such, as shown, the drawing shape 430 is presented on the canvas. As operating in edge mode, the stroke is generally consistent in appearance along the drawing shape 430. For instance, the drawn stroke is generally the same width around the shape. In some cases, the stroke may vary. For instance, some embodiments may adjust for angle or pressure of input object (e.g., finger or stylus). However, even with deviations in the input path, the drawn stroke 430 maintains a consistent stroke abutting the edge of the drawing guide.

Assume the user desires to generate another drawing shape. In such a case, the user may select to move the drawing guide 402 to a new position and, thereafter, trace around the drawing guide to effectuate a second drawing shape 432. As one example, to move the drawing guide 402, the user may select inside the drawing guide and drag the drawing guide to the desired position on the canvas.

Figure 5:
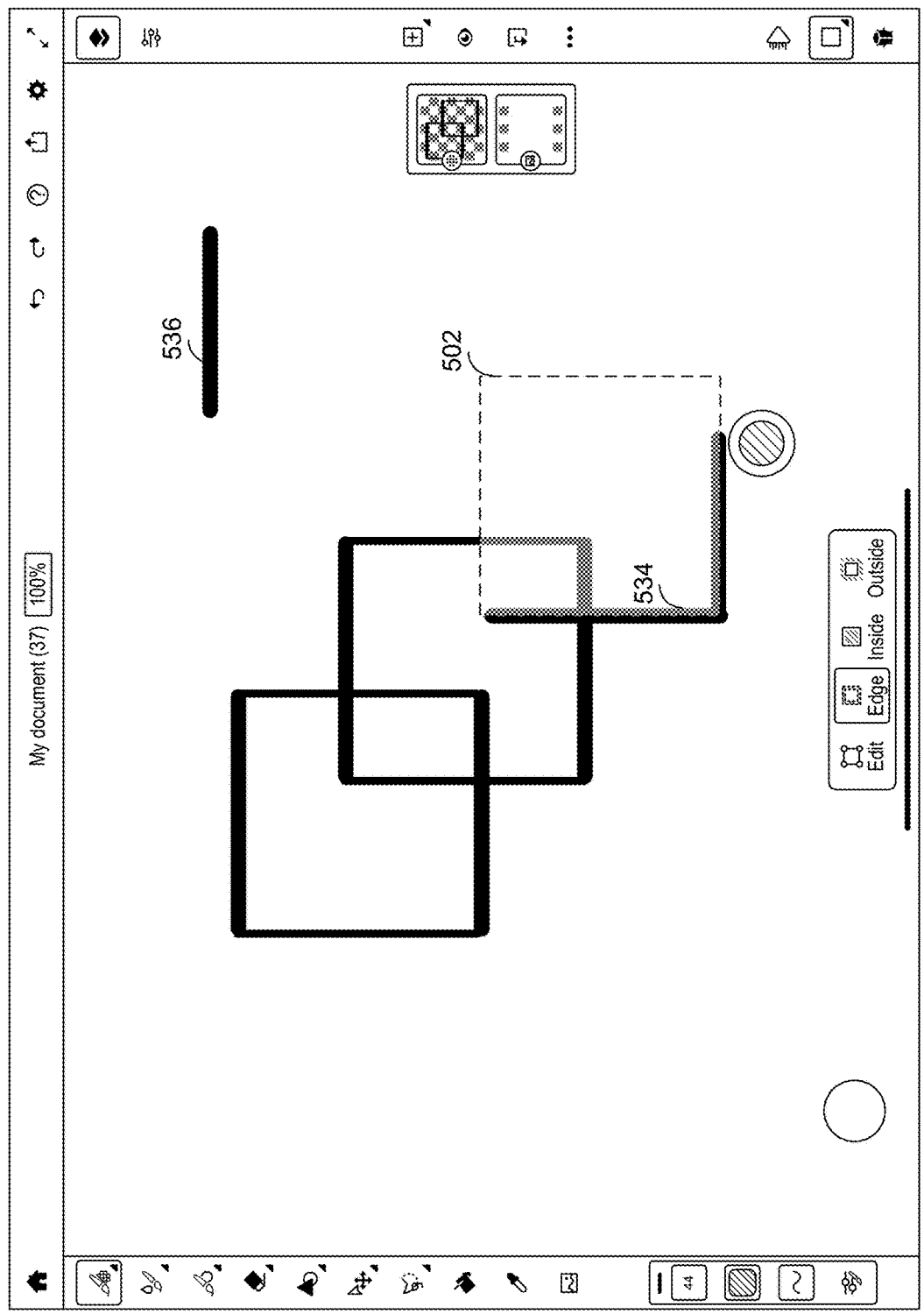
FIG. 5 is a third exemplary graphical user interface for using an adaptable drawing guide, in accordance with embodiments.

Similarly, the user can move the drawing guide 502 to a new position and trace the drawing guide 502 to effectuate a third drawing stroke 534, as shown in FIG. 5. As described herein, in accordance with edge mode, a user may elect to provide a free-form drawing outside of the template. In this way, in cases that a user initiates a drawing stroke outside of a threshold distance from the drawing guide 502 edge, a free-form stroke can be generated. As shown in FIG. 5, a user may select to add stroke 536 on the canvas while the drawing guide is still presented via the user interface. Advantageously, this allows a user to seamlessly transition from using the drawing guide as a stencil for tracing to a free-from drawing external to the guide while the guide remains displayed.

Figure 6:
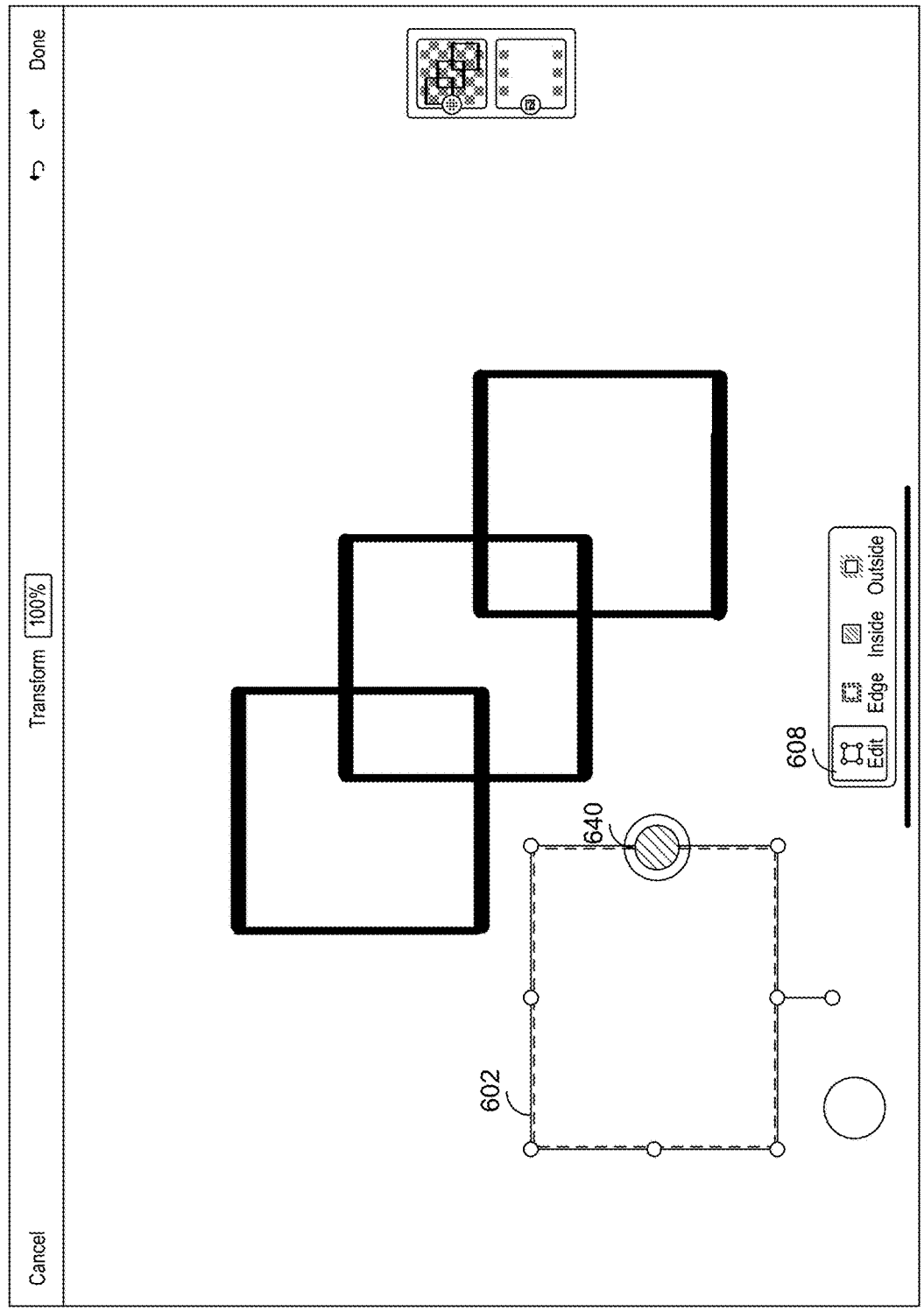
FIG. 6 is a fourth exemplary graphical user interface for using an adaptable drawing guide, in accordance with embodiments.

Turning now to FIG. 6, assume the user desires to manipulate or edit the drawing guide 602. In such a case, the user may select the edit icon 608 and, thereafter, manipulate the shape of the drawing guide 602. As illustrated in FIG. 6, the user may select and drag a guide edge 640 to modify the guide shape.

Figure 7:
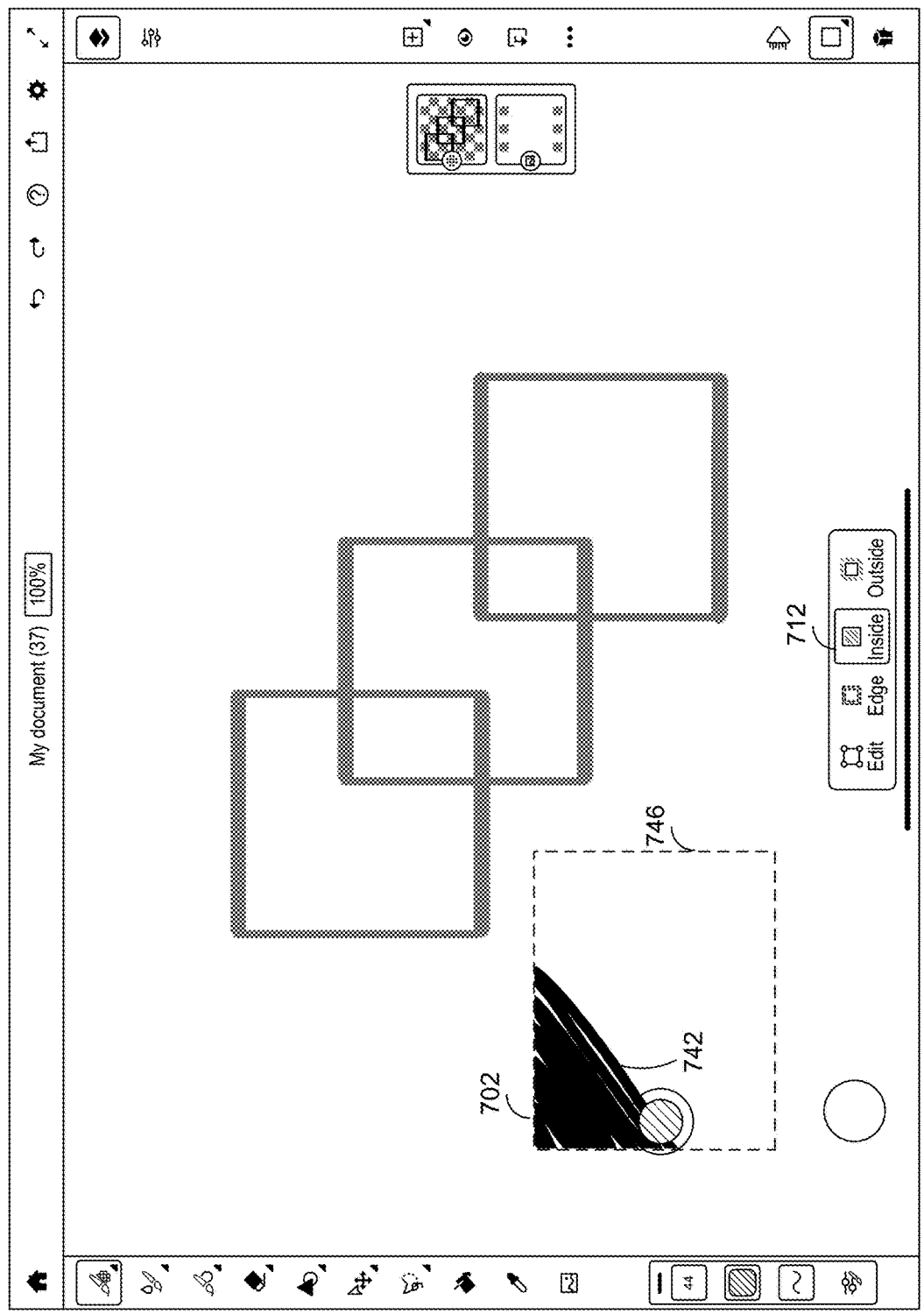
FIG. 7 is a fifth exemplary graphical user interface for using an adaptable drawing guide, in accordance with embodiments.

Now assume the user desires to use the drawing guide to draw within the boundaries of the drawing guide. In such a case, the user can select the inside mode represented via inside icon 712, as shown in FIG. 7. Upon selecting the inside mode 712, a user can free-form draw such that any drawn strokes 742 are maintained within the boundary 746 of the drawing guide 702. As such, even if a user moves the contact point or cursor outside of the drawing guide boundaries, the drawn strokes will only be visible within the drawing guide. In this way, the drawn strokes coincide, align, or match with the detected input path provided by a user when inside the boundaries or edges of the guide, but do not appear when the detected input path is outside the boundaries or edges of the guide.

Implementations for restricting the strokes to within the boundary of the drawing guide may vary. Generally, when an input path traverses to outside of the drawing guide, the stroke is discontinued being drawn until the input path returns to the inside of the drawing guide. For example, when drawing via "inside" mode, and an input path traverses outside of a drawing guide, no marks will be made on the canvas outside the drawing guide. In this regard, strokes will only be drawn when the input is contained within the drawing guide. For instance, when an input path starts within the drawing guide and continues outside the drawing guide, without discontinuing the input path (e.g., lift up finger or stylus), the stroke will only be drawn until the edge of the drawing guide. In cases that the input path is discontinued and then reinitiated outside of the drawing guide (e.g., lift a stylus up and begin trying to draw outside of the drawing aid), the user would trigger movement of the drawing guide.

On the other hand, when drawing via "outside" mode, and an input path traverses inside of a drawing guide, no marks will be made on the canvas within the drawing guide. In this regard, strokes will only be drawn when the input is contained outside of the drawing guide. For instance, when an input path starts outside of the drawing guide and continues inside the drawing guide, without discontinuing the input path, the stroke will only be drawn until the edge of the drawing guide. In cases that the input path is discontinued and then reinitiated inside the drawing guide, the user would trigger movement of the drawing guide.

Figure 8:
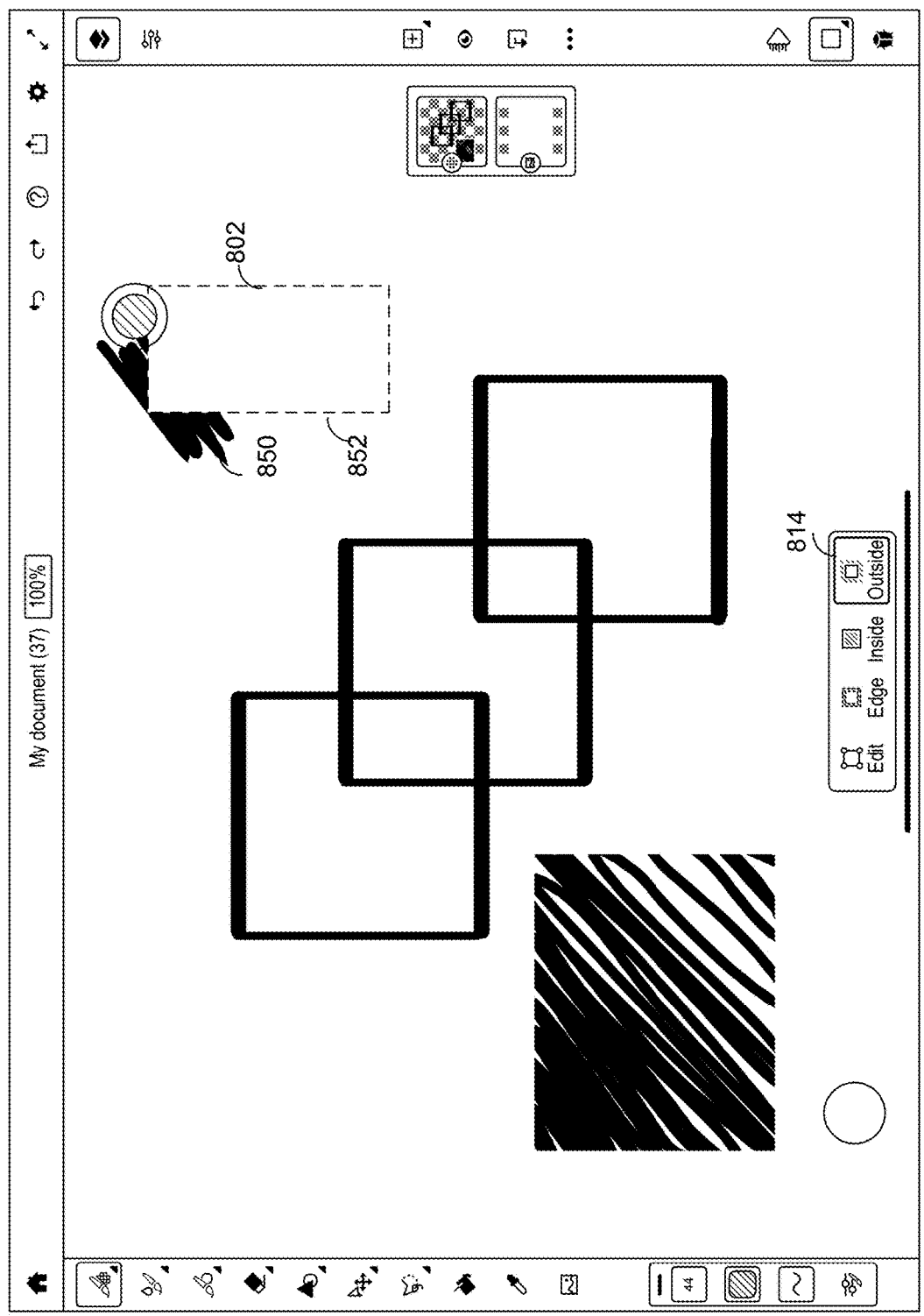
FIG. 8 is a sixth exemplary graphical user interface for using an adaptable drawing guide, in accordance with embodiments.

Turning to FIG. 8, the user may move the drawing guide 802 to another position and otherwise edit the shape of the drawing guide. As shown, assume the user selects the outside mode 814. In such a case, a user can free-form draw such that any drawn strokes 850 are maintained outside of the boundary 852 of the drawing guide 802. Accordingly, even if a user moves the contact point or cursor inside of the drawing guide boundaries, the drawn strokes will only be visible outside of the drawing guide. The drawing guide acts as a shield or guard from any strokes being presented within the drawing guide 802. As can be appreciated, in some cases with the outside mode, the outline or edges can be traced but are traced in more of a free-form manner and not necessarily a consistent application of a drawing stroke that abuts the guide edges.

The various shapes and strokes can be drawn on a single layer or multiple, layers. For example, multiple traced shapes may be associated with a single layer, or each traced shape may be associated with separate layers.

Example Process Flows Associated with an Adaptable Drawing Guide Tool

With reference now to FIGS. 9-12, FIGS. 9-12 provide method flows related to facilitating stroke drawing using an adaptable drawing guide(s), in accordance with embodiments of the present technology. Each block of method 900, 1000, 1100, and 1200 comprises a computing process that may be performed using any combination of hardware, firmware, and/or software. For instance, various functions may be carried out by a processor executing instructions stored in memory. The methods may also be embodied as computer-usable instructions stored on computer storage media. The methods may be provided by a standalone application, a service or hosted service (standalone or in combination with another hosted service), or a plug-in to another product, to name a few. The method flows of FIGS. 9-12 are exemplary only and not intended to be limiting. As can be appreciated, in some embodiments, method flows 900-1200 may be implemented, at least in part, in real time to enable visualization of drawn strokes to be provided to a user.

Figure 9:
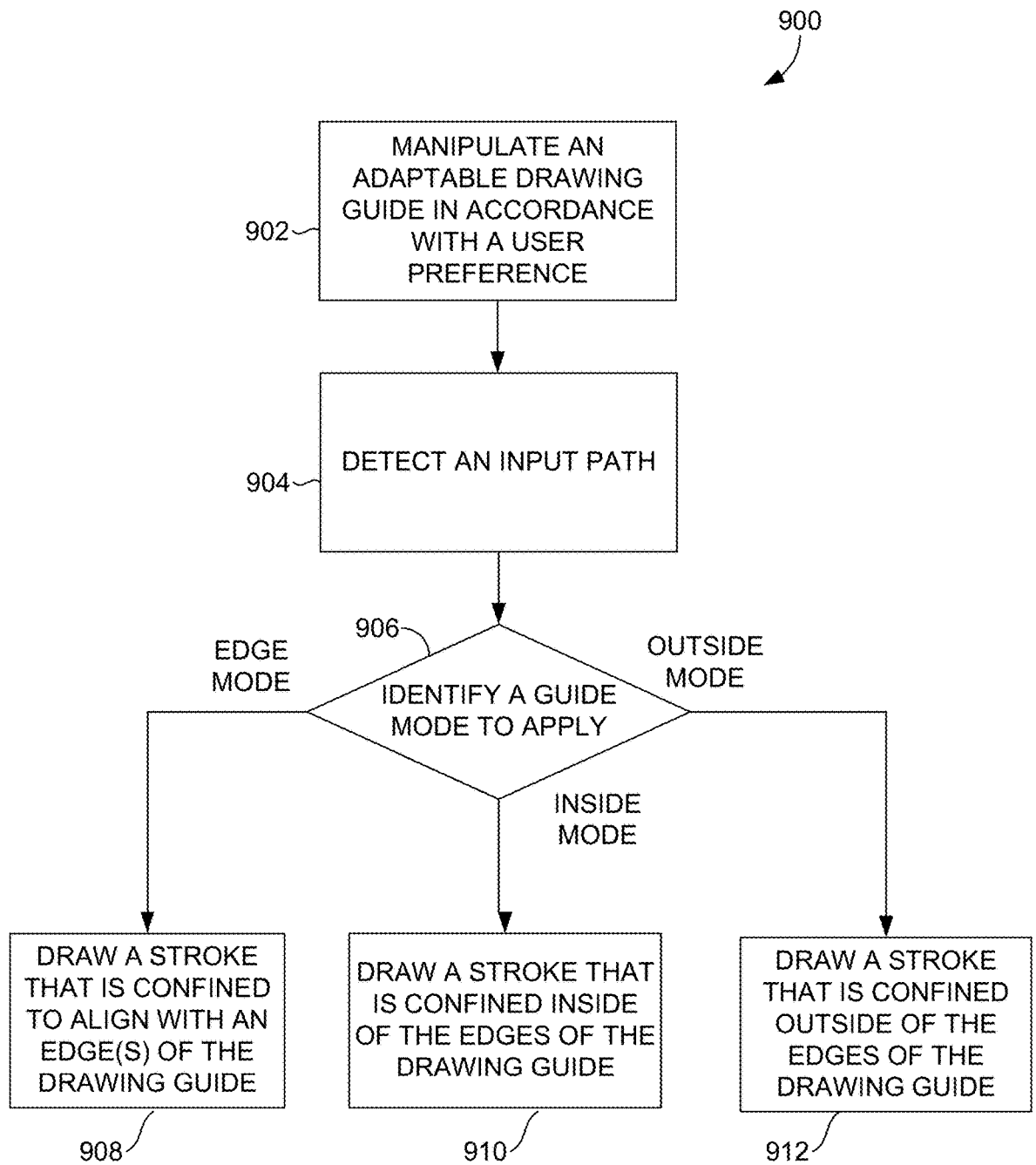
FIG. 9 is a flow diagram showing a method for facilitating drawing using an adaptable drawing guide, in accordance with embodiments described herein.

Turning now to FIG. 9, a flow diagram is provided that illustrates a method 900 for facilitating drawing using an adaptable drawing guide, in accordance with embodiments described herein. At block 902, an adaptable drawing guide is manipulated, in accordance with a user preference. In particular, a user may position, size, scale, or otherwise specify modification of the drawing guide for use in drawing. At block 904, an input path is detected. In some cases, an input path may be input by a user via a touch screen to indicate a desired stroke to be drawn on the graphical user interface. At block 906, a guide mode, of a set of guide modes (e.g., an edge mode, an inside mode, and an outside mode), to apply to the adaptable drawing guide is identified. Generally, the guide mode indicates a manner in which to use the drawing guide to confine strokes corresponding with input paths. In some implementations, a guide mode may be selected by a user, for example, via a graphical user interface that presents guide mode options. When operating in edge mode, at block 908, a stroke that is confined to align with at least one edge of a set of edges of the drawing guide is drawn in accordance with the input path. When operating in inside mode, at block 910, a stroke that is confined inside of the set of edges of the drawing guide is drawn. When operating in outside mode, at block 912, a stroke that is confined outside of the set of edges of the drawing guide is drawn.

Figure 10:
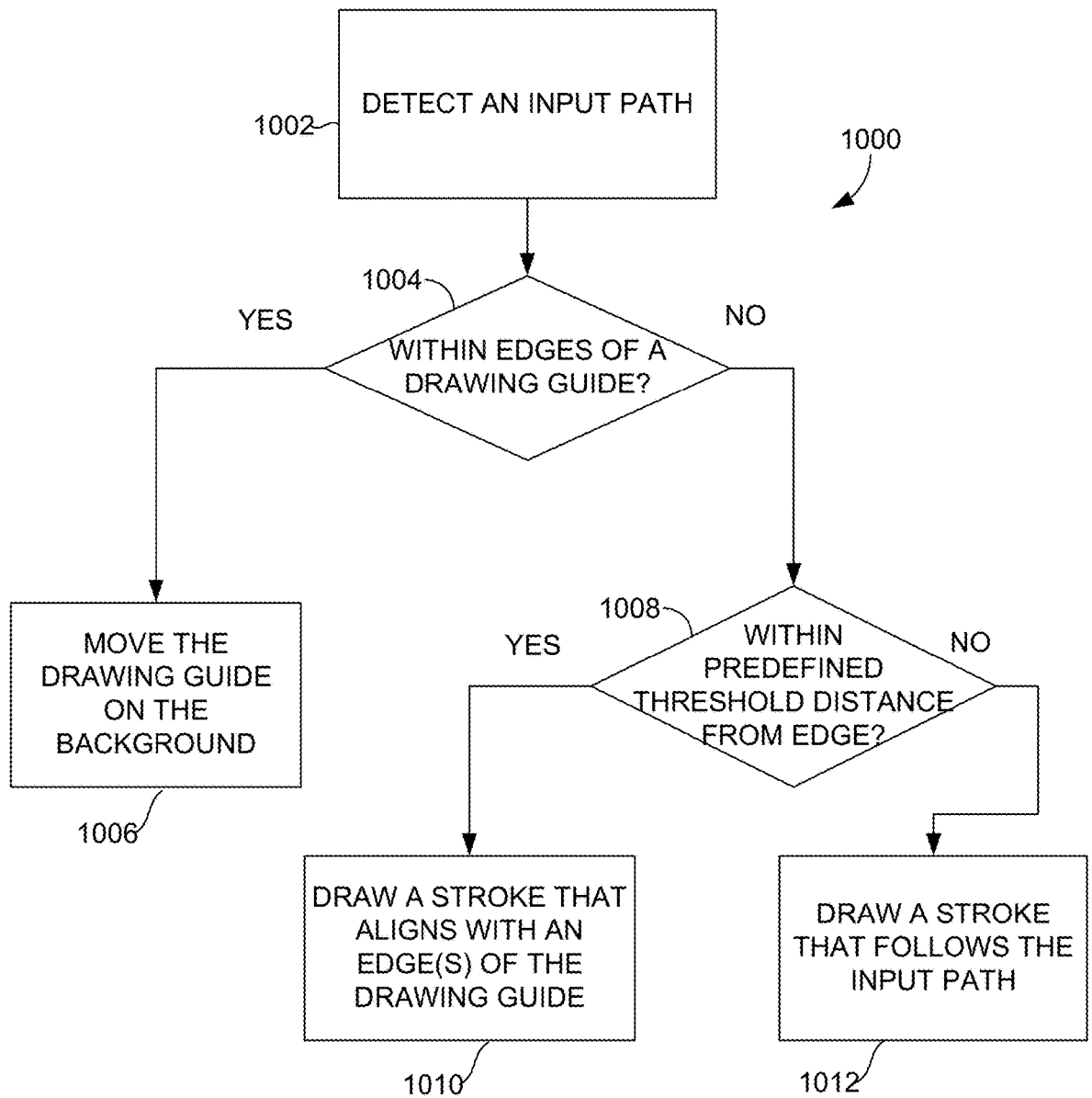
FIG. 10 is a flow diagram showing a method for drawing a stroke(s) when an adaptable drawing guide operates in an edge mode, in accordance with embodiments described herein.

The flow diagram illustrated in FIG. 10 provides an example method 1000 for drawing a stroke(s) when an adaptable drawing guide operates in an edge mode, in accordance with embodiments described herein. At block 1002, an input path is detected when an adaptable drawing guide is operating in an edge mode. At block 1004, a determination is made as to whether an initial portion of the input path is within the edges of the drawing guide. If so, at block 1006, the input path is used to move the drawing guide on the background. In this way, the input path is used to reposition the drawing guide. If the initial portion of the input path is not within the edges of the drawing guide, a determination is made as to whether the initial portion of the input path is within a predefined threshold distance from an edge of the drawing guide, as indicated at block 1008. If so, the input path is used to draw a stroke that aligns or abuts with an edge(s) of the drawing guide, as indicated at block 1010. If, however, the initial portion of the input path is not within a predefined threshold distance from an edge of the drawing guide, as indicated at block 1012, a stroke is drawn that follows the input path. In this way, the stroke is drawn in a free form manner outside of the drawing guide, wherein the drawing guide guards any stroke from entering the confines of the drawing guide.

Figure 11:
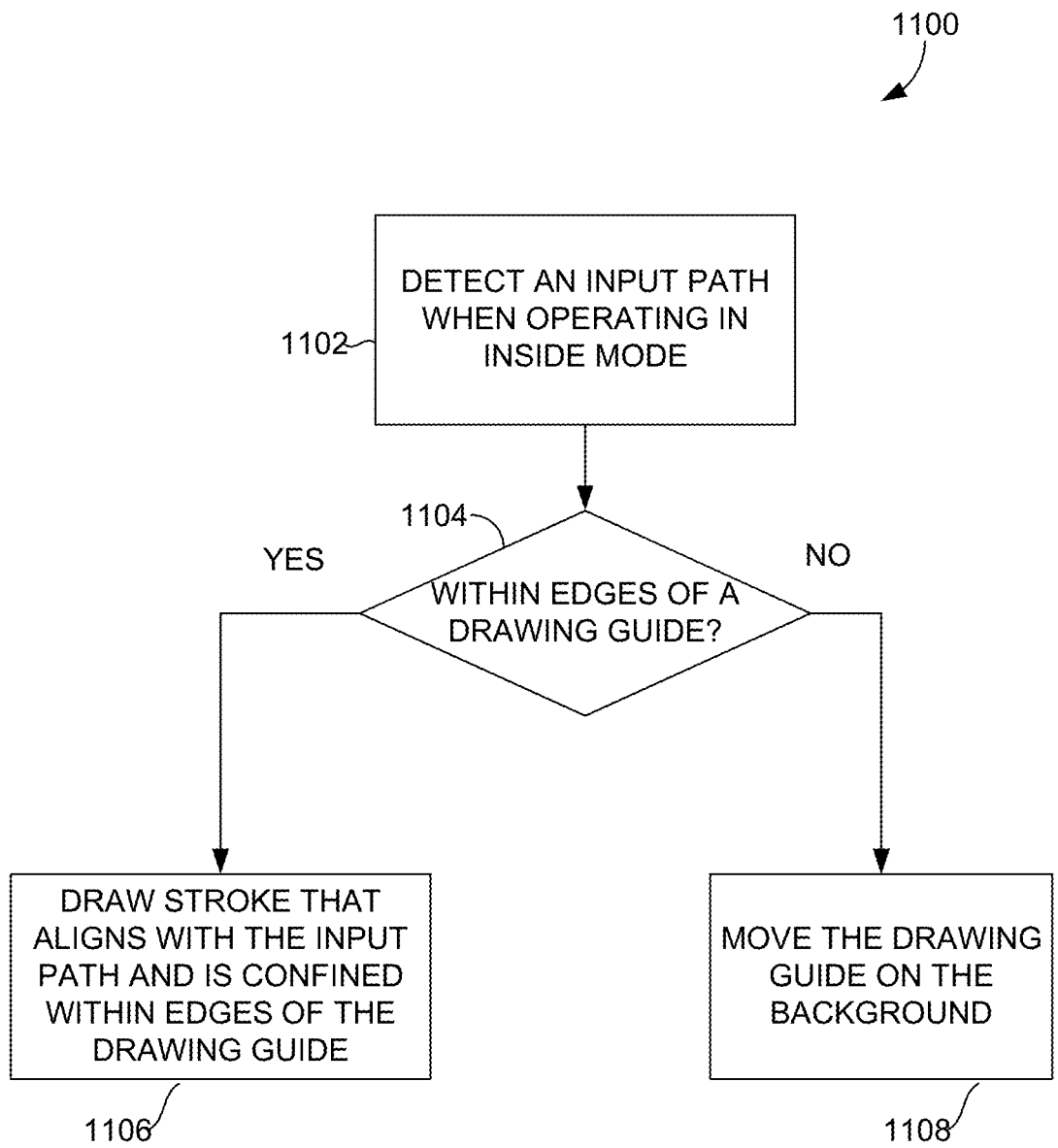
FIG. 11 is a flow diagram showing a method for drawing a stroke(s) when an adaptable drawing guide operates in an inside mode, in accordance with embodiments described herein.

The flow diagram illustrated in FIG. 11 provides an example method 1100 for drawing a stroke(s) when an adaptable drawing guide operates in an inside mode, in accordance with embodiments described herein. At block 1102, an input path is detected when an adaptable drawing guide is operating in an inside mode. At block 1104, a determination is made as to whether an initial portion of the input path is within the edges of the drawing guide. If so, a stroke is drawn that aligns with the input path and is confined within the edges of the drawing guide, as indicated at block 1106. If, however, the initial portion of the input path is not within the edges of the drawing guide, the input path is used to move the drawing guide on the background, as shown at block 1108. As such, the input path is used to reposition the drawing guide. Although method flow 1100 illustrates a determination as to whether the input path is within the edges of the drawing guide, as can be appreciated, other implementations may determine whether the input path is outside the edges of the drawing guide.

Figure 12:
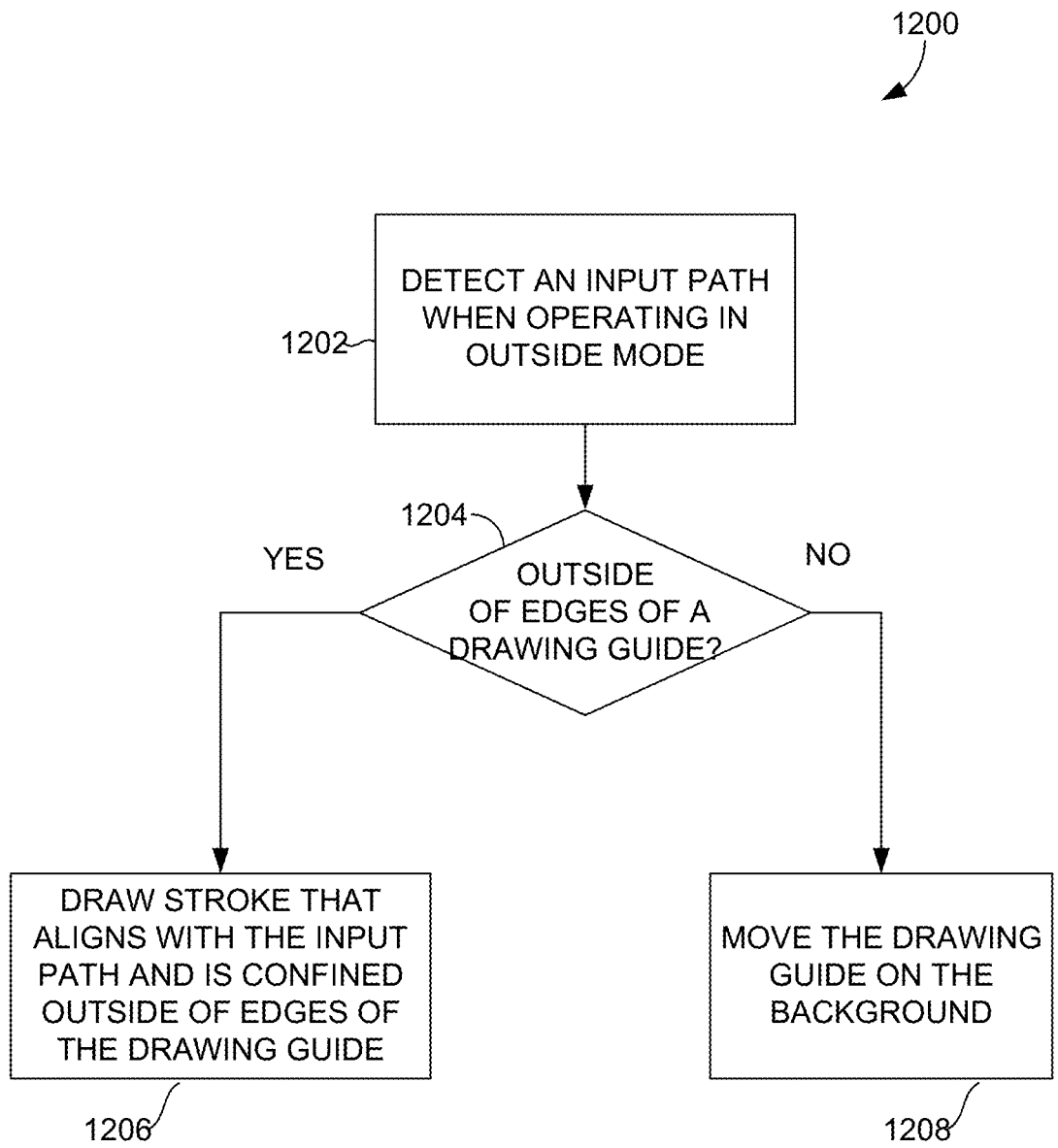
FIG. 12 is a flow diagram showing a method for drawing a stroke(s) when an adaptable drawing guide operates in an outside mode, in accordance with embodiments described herein.

The flow diagram illustrated in FIG. 12 provides an example method 1200 for drawing a stroke(s) when an adaptable drawing guide operates in an outside mode, in accordance with embodiments described herein. At block 1202, an input path is detected when an adaptable drawing guide is operating in an outside mode. At block 1204, a determination is made as to whether an initial portion of the input path is outside the edges of the drawing guide. If so, a stroke is drawn that aligns with the input path and is confined to outside of the edges of the drawing guide, as indicated at block 1206. If, however, the initial portion of the input path is not outside of the edges of the drawing guide, the input path is used to move the drawing guide on the background, as shown at block 1208. As such, the input path is used to reposition the drawing guide. Although method flow 1200 illustrates a determination as to whether the input path is outside the edges of the drawing guide, as can be appreciated, other implementations may determine whether the input path is within the edges of the drawing guide.

Example Operating Environment

Figure 13:
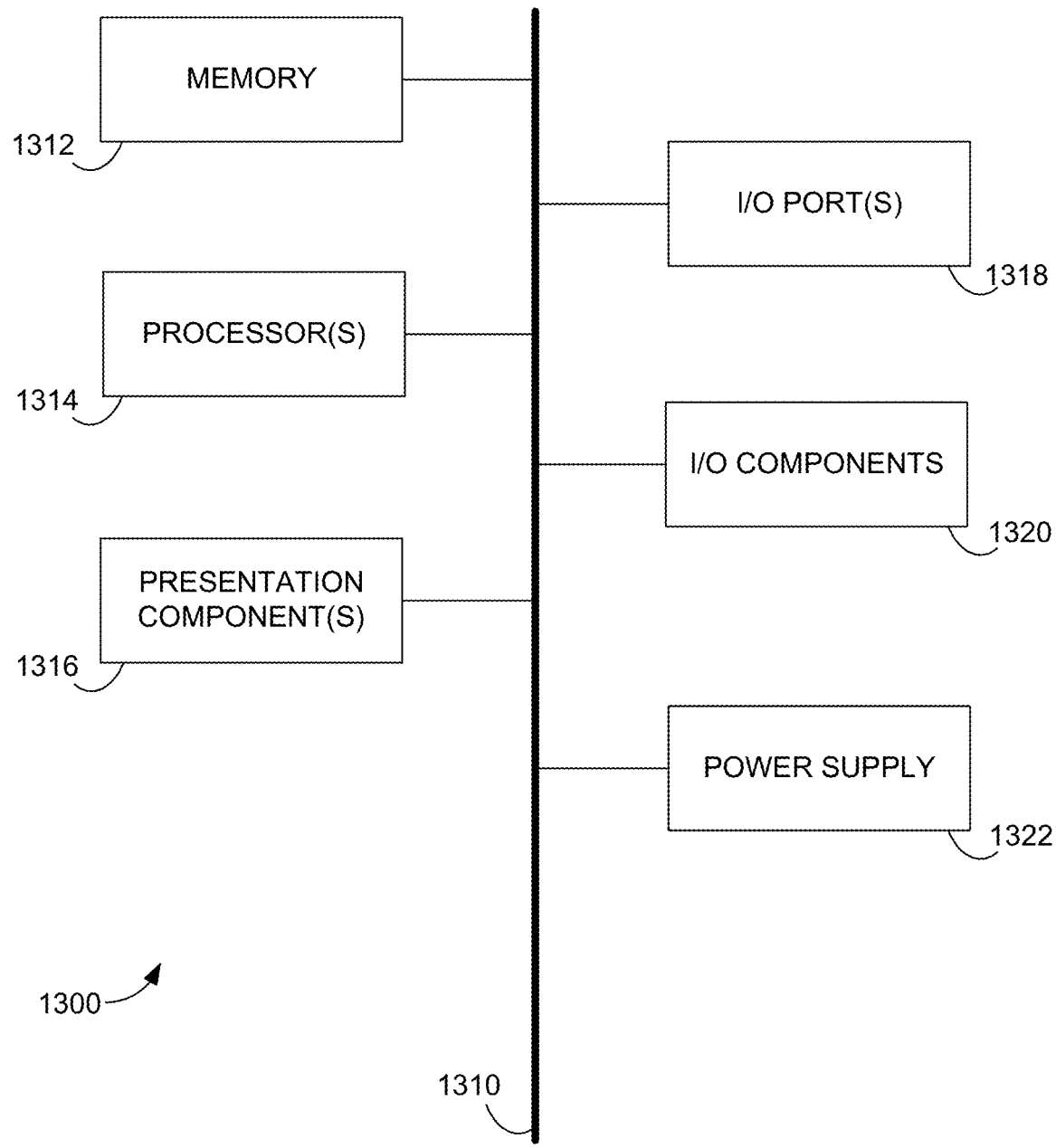
FIG. 13 is a block diagram of an exemplary computing device in which embodiments of the invention may be employed.

Having described an overview of embodiments of the present invention, an exemplary operating environment in which embodiments of the present invention may be implemented is described below in order to provide a general context for various aspects of the present invention. Referring initially to FIG. 13 in particular, an exemplary operating environment for implementing embodiments of the present invention is shown and designated generally as computing device 1300. Computing device 1300 is but one example of a suitable computing environment and is not intended to suggest any limitation as to the scope of use or functionality of the invention. Neither should the computing device 1300 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With reference to FIG. 13, computing device 1300 includes a bus 1310 that directly or indirectly couples the following devices: memory 1312, one or more processors 1314, one or more presentation components 1316, input/output (I/O) ports 1318, input/output components 1320, and an illustrative power supply 1322. Bus 1310 represents what may be one or more busses (such as an address bus, data bus, or combination thereof). Although the various blocks of FIG. 13 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventor recognizes that such is the nature of the art, and reiterates that the diagram of FIG. 13 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 13 and reference to "computing device."

Computing device 1300 typically includes a variety of computer-readable media. Computer-readable media can be any available media that can be accessed by computing device 1300 and includes both volatile and nonvolatile media, and removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 1300. Computer storage media does not comprise signals per se. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 1312 includes computer-storage media in the form of volatile and/or nonvolatile memory. The memory may be removable, non-removable, or a combination thereof. Exemplary hardware devices include solid-state memory, hard drives, optical-disc drives, etc. Computing device 1300 includes one or more processors that read data from various entities such as memory 1312 or I/O components 1320. Presentation component(s) 1316 present data indications to a user or other device. Exemplary presentation components include a display device, speaker, printing component, vibrating component, etc.

I/O ports 1318 allow computing device 1300 to be logically coupled to other devices including I/O components 1320, some of which may be built in. Illustrative components include a microphone, joystick, game pad, satellite dish, scanner, printer, wireless device, etc. The I/O components 1320 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the computing device 1300. The computing device 1300 may be equipped with depth cameras, such as stereoscopic camera systems, infrared camera systems, RGB camera systems, touchscreen technology, and combinations of these, for gesture detection and recognition. Additionally, the computing device 1300 may be equipped with accelerometers or gyroscopes that enable detection of motion. The output of the accelerometers or gyroscopes may be provided to the display of the computing device 1300 to render immersive augmented reality or virtual reality.

The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and subcombinations are of utility and may be employed without reference to other features and subcombinations. This is contemplated by and is within the scope of the claims.

What is claimed is:

1. One or more computer storage media storing computer-useable instructions that, when used by one or more computing devices, cause the one or more computing devices to perform operations comprising:
    identifying a guide mode, of a set of guide modes, indicating a manner in which to use a drawing guide to confine strokes corresponding with input paths, wherein the set of guide modes comprises an edge mode, an inside mode, and an outside mode, wherein identifying the guide mode comprises determining a proximity between an input point and an edge of a set of edges of the drawing guide and whether the input point is confined inside or outside of the set of edges of the drawing guide;
    detecting an input path; and
    in accordance with the input path, drawing, on a background, a stroke that is confined in accordance with the set of edges of the drawing guide based on the guide mode, wherein
    when the identified guide mode comprises the edge mode, the draw stroke is confined to align with at least one edge of the drawing guide,
    when the identified guide mode comprises the inside mode, the draw stroke is confined inside of the set of edges of the drawing guide, and
    when the identified guide mode comprises the outside mode, the draw stroke is confined outside of the set of edges of the drawing guide.

2. The one or more computer storage media of claim 1, wherein an indication of each of the set of guide modes are concurrently presented via a graphical user interface.

3. The one or more computer storage media of claim 2, wherein the guide mode is identified based on a user selection of the guide mode.

4. The one or more computer storage media of claim 1, wherein when the identified guide mode comprises the edge mode, determining that the input path is within a predetermined distance threshold to the at least one edge of the drawing guide, and wherein when the identified guide mode comprises the inside mode, determining that the input path is outside the predetermined distance threshold to the at least one edge of the drawing guide and confined inside of the set of edges of the drawing guide, and wherein when the identified guide mode comprises the outside mode, determining that the input path is outside the predetermined distance threshold to the at least one edge of the drawing guide and confined outside of the set of edges of the drawing guide.

5. The one or more computer storage media of claim 1, wherein the input path is provided via a touch input on a touchscreen display.

6. The one or more computer storage media of claim 1 further comprising:
    receiving a user selection of a second guide mode; and
    in accordance with a second input path, drawing a second stroke that is confined in accordance with the set of edges of the drawing guide based on the second guide mode, the second guide mode being different from the guide mode.

7. The one or more computer storage media of claim 1 further comprising manipulating the drawing guide to modify a size, a scale, a shape, and/or a position of the drawing guide.

8. The one or more computer storage media of claim 1 further comprising:
    receiving a user selection of a second drawing guide; and
    using the second drawing guide to confine a second stroke in accordance with a second set of edges of the second drawing guide.

9. A computer-implemented method comprising:
    applying, via a stroke drawer, a guide mode, of a set of guide modes, indicating a manner in which to use a drawing guide to confine strokes corresponding with input paths, wherein the set of guide modes comprises an inside mode and an outside mode, and wherein applying the guide mode is based on each of a positon of an initial path of the input paths relative to one or more edges of a set of edges of the drawing guide and whether the position of the initial path is confined inside or outside of the set of edges of the drawing guide, wherein the inside mode is applied based on the position of the initial path being confined inside of the set of edges, and wherein the outside mode is applied based on the position of the initial path being confined outside of the set of edges;
    detecting, via the stroke drawer, an input path; and
    in accordance with the input path, drawing, via the stroke drawer on a background, a stroke that is confined in accordance with the set of edges of the drawing guide based on the guide mode, wherein
    when the applied guide mode comprises the inside mode, the drawn stroke is confined inside of the set of edges of the drawing guide, and
    when the applied guide mode comprises the outside mode, the draw stroke is confined outside of the set of edges of the drawing guide.

10. The method of claim 9, wherein when the applied guide mode comprises the inside mode, the drawn stroke is confined inside of the set of edges of the drawing guide when the input path is outside of the set of edges of the drawing guide.

11. The method of claim 9, wherein when the applied guide mode comprises the outside mode, the drawn stroke is confined outside of the set of edges of the drawing guide when the input path is inside of the set of edges of the drawing guide.

12. The method of claim 9, wherein the set of guide modes further comprises an edge mode, and wherein the edge mode is applied based on the position of the initial path being within a predetermined distance threshold to an edge of the set of edges of the drawing guide.

13. The method of claim 9 further comprising:
receiving a user selection of a second guide mode; and
in accordance with a second input path, drawing a second stroke that is confined in accordance with the set of edges of the drawing guide based on the second guide mode, the second guide mode being different from the guide mode.

14. One or more computer storage media storing computer-useable instructions that, when used by one or more computing devices, cause the one or more computing devices to perform operations comprising:
receiving, via a graphical user interface, a first selection of an inside mode indicating to confine strokes to an inside of a drawing guide, wherein the first selection of the inside mode is based on each of a first input path being within a set of edges of the drawing guide and being outside a threshold distance of an edge of the drawing guide;
based on the first input path, drawing a stroke that aligns with the first input path and is internally confined by the set of edges of the drawing guide;
receiving, via the graphical user interface, a second selection of an outside mode indicating to confine strokes to an outside of the drawing guide, wherein the second selection of the outside mode is based on each of a second input path being outside the set of edges of the drawing guide and being outside the threshold distance of an edge of the drawing guide;
transitioning the drawing guide from operating in the inside mode to operating in the outside mode; and
based on the second input path, drawing a stroke that aligns with the second input path and is externally confined by the set of edges of the drawing guide.

15. The one or more computer storage media of claim 14, further comprising:
receiving, via the graphical user interface, a third selection of an edge mode indicating to confine strokes to an edge of the drawing guide, wherein the third selection of the edge mode is based on a third input path being within the threshold distance of an edge of the drawing guide; and
based on the third input path, drawing a stroke that aligns with the edge of the drawing guide.

16. The one or more computer storage media of claim 15, wherein a width of the stroke is centered on the edge of the drawing guide.

17. The one or more computer storage media of claim 14, wherein when the first input path traverses to outside of the drawing guide, the stroke is discontinued being drawn until the first input path returns to the inside of the drawing guide.

18. The one or more computer storage media of claim 14, wherein when the second input path traverses to the inside of the drawing guide, the stroke is discontinued being drawn until the second input path returns to the outside of the drawing guide.

19. The one or more computer storage media of claim 14 further comprising manipulating the drawing guide to modify a size, a scale, a shape, and/or a position of the drawing guide.

20. The one or more computer storage media of claim 14, wherein the set of guide mode options are concurrently presented via the graphical user interface.

* * * * *

UNITED STATES PATENT AND TRADEMARK OFFICE
CERTIFICATE OF CORRECTION

| | | |
|---|---|---|
| PATENT NO. | : 11,481,938 B2 | Page 1 of 1 |
| APPLICATION NO. | : 17/062282 | |
| DATED | : October 25, 2022 | |
| INVENTOR(S) | : Elissa A. Welsh et al. | |

It is certified that error appears in the above-identified patent and that said Letters Patent is hereby corrected as shown below:

In the Claims

Column 21, Line 43, In Claim 1, delete "draw" and insert -- drawn --.

Column 21, Line 46, In Claim 1, delete "draw" and insert -- drawn --.

Column 21, Line 49, In Claim 1, delete "draw" and insert -- drawn --.

Column 22, Line 51, In Claim 9, delete "draw" and insert -- drawn --.

Signed and Sealed this
Thirty-first Day of January, 2023

Katherine Kelly Vidal
*Director of the United States Patent and Trademark Office*